United States Patent
Ouyang et al.

(10) Patent No.: US 9,703,394 B2
(45) Date of Patent: Jul. 11, 2017

(54) UNLEARNING TECHNIQUES FOR ADAPTIVE LANGUAGE MODELS IN TEXT ENTRY

(71) Applicant: Google Inc., Mountain View, CA (US)

(72) Inventors: Yu Ouyang, San Jose, CA (US);
Shumin Zhai, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/873,147

(22) Filed: Oct. 1, 2015

(65) Prior Publication Data

US 2016/0282956 A1    Sep. 29, 2016

Related U.S. Application Data

(60) Provisional application No. 62/137,621, filed on Mar. 24, 2015.

(51) Int. Cl.
| | | |
|---|---|---|
| *G06F 17/20* | (2006.01) | |
| *G06F 17/22* | (2006.01) | |
| *G06F 17/24* | (2006.01) | |
| *G06F 3/023* | (2006.01) | |
| *G06F 3/0488* | (2013.01) | |
| *G06F 17/27* | (2006.01) | |

(52) U.S. Cl.
CPC ........ *G06F 3/0237* (2013.01); *G06F 3/04883* (2013.01); *G06F 3/04886* (2013.01); *G06F 17/20* (2013.01); *G06F 17/22* (2013.01); *G06F 17/24* (2013.01); *G06F 17/2715* (2013.01); *G06F 2203/04808* (2013.01)

(58) Field of Classification Search
None
See application file for complete search history.

(56) References Cited

U.S. PATENT DOCUMENTS 4,783,803 A * 11/1988 Baker .................. G10L 15/00
                                                        704/252
5,146,405 A *  9/1992 Church ................ G06F 17/271
                                                          700/90

(Continued)

OTHER PUBLICATIONS

"How do I personalize SwiftKey and add a new word to my predictions?", SwiftKey Blog [online]. Aug. 6, 2014 Retrieved from the Internet: <https://blog.swiftkey.com/personalize-swiftkey-add-new-word-predictions/> 13 pgs.

(Continued)

*Primary Examiner* — Pierre-Louis Desir
*Assistant Examiner* — David Kovacek
(74) *Attorney, Agent, or Firm* — Shumaker & Sieffert, P.A.

(57) ABSTRACT

In some examples, a method includes outputting a graphical keyboard (120) for display and responsive to receiving an indication of a first input (124), determining a new character string that is not included in a language model. The method may include adding the new character string to the language model and associating a likelihood value with the new character string. The method may include, responsive to receiving an indication of a second input, predicting the new character string, and responsive to receiving an indication of a third input that rejects the new character string, decreasing the likelihood value associated with the new character string.

20 Claims, 5 Drawing Sheets

(56) References Cited

U.S. PATENT DOCUMENTS

| | | | | |
|---|---|---|---|---|
| 5,502,774 A * | 3/1996 | Bellegarda | ............ | G06K 9/6293 |
| | | | | 382/116 |
| 6,314,399 B1 * | 11/2001 | Deligne | ................ | G10L 15/197 |
| | | | | 704/240 |
| 7,877,258 B1 * | 1/2011 | Chelba | ................ | G06F 17/2715 |
| | | | | 704/240 |
| 8,260,615 B1 * | 9/2012 | Nakajima | ............. | G10L 15/183 |
| | | | | 704/2 |
| 8,498,864 B1 * | 7/2013 | Liang | ...................... | G10L 15/22 |
| | | | | 369/25.01 |
| 8,701,032 B1 * | 4/2014 | Zhai | .................... | G06F 3/04886 |
| | | | | 715/773 |
| 8,725,509 B1 * | 5/2014 | Harb | ...................... | G06F 17/277 |
| | | | | 704/10 |
| 8,798,983 B2 * | 8/2014 | Ohtsuki | ............. | G06F 17/2223 |
| | | | | 704/1 |
| 8,825,474 B1 * | 9/2014 | Zhai | ...................... | G06F 17/276 |
| | | | | 704/1 |
| 2003/0046073 A1 * | 3/2003 | Mori | .................... | G10L 15/193 |
| | | | | 704/251 |
| 2005/0060138 A1 * | 3/2005 | Wang | ....................... | G06F 3/018 |
| | | | | 704/1 |
| 2005/0256715 A1 * | 11/2005 | Okimoto | ............ | G06F 17/2715 |
| | | | | 704/257 |
| 2005/0283725 A1 * | 12/2005 | Griffin | ................ | G06F 17/2735 |
| | | | | 715/259 |
| 2007/0127688 A1 * | 6/2007 | Doulton | ................ | G10L 15/265 |
| | | | | 379/265.01 |
| 2008/0195388 A1 * | 8/2008 | Bower | .................. | G06F 3/0237 |
| | | | | 704/243 |
| 2008/0228463 A1 * | 9/2008 | Mori | .................... | G06F 17/2863 |
| | | | | 704/2 |
| 2008/0243500 A1 * | 10/2008 | Bisani | ................ | G06F 17/2715 |
| | | | | 704/235 |
| 2008/0255844 A1 * | 10/2008 | Wu | ....................... | G10L 15/193 |
| | | | | 704/255 |
| 2009/0193334 A1 * | 7/2009 | Assadollahi | .......... | G06F 17/276 |
| | | | | 715/261 |
| 2010/0070908 A1 | 3/2010 | Mori et al. | | |
| 2011/0010174 A1 * | 1/2011 | Longe | ..................... | G10L 15/24 |
| | | | | 704/235 |
| 2011/0071834 A1 * | 3/2011 | Kristensson | .......... | G06F 3/0237 |
| | | | | 704/251 |
| 2012/0259615 A1 * | 10/2012 | Morin | .................... | G06F 17/276 |
| | | | | 704/9 |
| 2013/0046544 A1 * | 2/2013 | Kay | ..................... | G06F 3/04883 |
| | | | | 704/275 |
| 2014/0278349 A1 * | 9/2014 | Grieves | ............... | G06F 17/2735 |
| | | | | 704/8 |
| 2014/0297267 A1 * | 10/2014 | Spencer | ................ | G06F 17/276 |
| | | | | 704/9 |
| 2014/0316784 A1 * | 10/2014 | Bradford | ................. | G10L 15/18 |
| | | | | 704/245 |
| 2014/0358519 A1 * | 12/2014 | Mirkin | ................ | G06F 17/2854 |
| | | | | 704/3 |
| 2015/0026628 A1 * | 1/2015 | Ouyang | .................. | G06F 3/0482 |
| | | | | 715/773 |
| 2015/0073805 A1 * | 3/2015 | Stern | ........................ | G10L 13/07 |
| | | | | 704/260 |
| 2015/0269934 A1 * | 9/2015 | Biadsy | .................. | G10L 15/197 |
| | | | | 704/235 |

OTHER PUBLICATIONS

Henry, "How Predictive Keyboards Work (and How You Can Train Yours Better)", lifehacker [online]. Oct. 8, 2014. Retrieved from the Internet: <http://lifehacker.com/how-predictive-keyboards-work-and-how-you-can-train-yo-1643795640> 19 pgs.

Murphy, "Android Keyboard App Gets Personalized Suggestions", PC Mag [online]. Mar. 20, 2014. Retrieved from the Internet: <http://www.pcmag.com/article2/0,2817,2455227,00.asp> 3 pgs.

Volpe, "Google Keyboard's autocorrect gets better if you let is mine your data", engadget [online]. Mar. 19, 2014. Retrieved from the Internet: <http://www.engadget.com/2014/03/19/google-keyboard-update/> 4 pgs.

* cited by examiner

UNLEARNING TECHNIQUES FOR ADAPTIVE LANGUAGE MODELS IN TEXT ENTRY

RELATED APPLICATION

This application claims the benefit of U.S. Provisional Application No. 62/137,621, filed Mar. 24, 2015, the entire content of which is hereby incorporated by reference.

BACKGROUND

Some computing devices provide a graphical keyboard as part of a user interface for text entry. For instance, a presence-sensitive display included in or coupled to a computing device may output a graphical keyboard that enables a user to enter data by selecting keys displayed at the presence-sensitive display. In some cases, the computing device may present a graphical keyboard with which a user can interact by tapping individual keys of the keyboard or by sliding a finger over successive regions associated with desired keys. In this way, graphical keyboards provide an input method that allows a user to enter characters, words, or groups of words with one or more gestures. As such, a graphical keyboard may allow a user to quickly and accurately enter text into a computing device.

A computing device that receives input from a graphical keyboard may employ word prediction, auto-correction, and/or suggestion techniques to determine words indicated by the gesture input. Some graphical keyboards may learn new words that are inputted by a user, which were not previously stored in a dictionary of the computing device. Such techniques may provide for later prediction of the newly added word, but in some instances the user may not desire for the computing device to predict the newly added word. As such, a user may need to perform additional actions to correct erroneous predictions, thus slowing down user input and reducing the efficiency of gesture-based text input.

DETAILED DESCRIPTION

Techniques of this disclosure may enable a computing device to adaptively unlearn character strings that the computing device previously learned and stored in a language model. For instance, if the computing device learns a new word not previously included in the language model and later predicts the new character string in response to user input, the user may reject the new character string causing the computing device to gradually "unlearn" the new character string. In some examples, unlearning a character string may include decreasing a likelihood value associated with the new character string. For instance, if the computing device receives an indication of user input that rejects the character string, the computing device may decrease the likelihood value without removing the new character string entirely from the language model and/or a dictionary stored by the computing device. Rather than only permitting the user to entirely remove the new character string from the language model, techniques of this disclosure may gradually decrease the likelihood value of the character string based on user input that rejects the new character string. Accordingly, techniques of this disclosure may enable a computing device to learn new character strings more aggressively that were not previously included in a language model, and thereby improve the accuracy of predicting new character strings in various input contexts based on user inputs that previously rejected the new character string.

Figure 1:
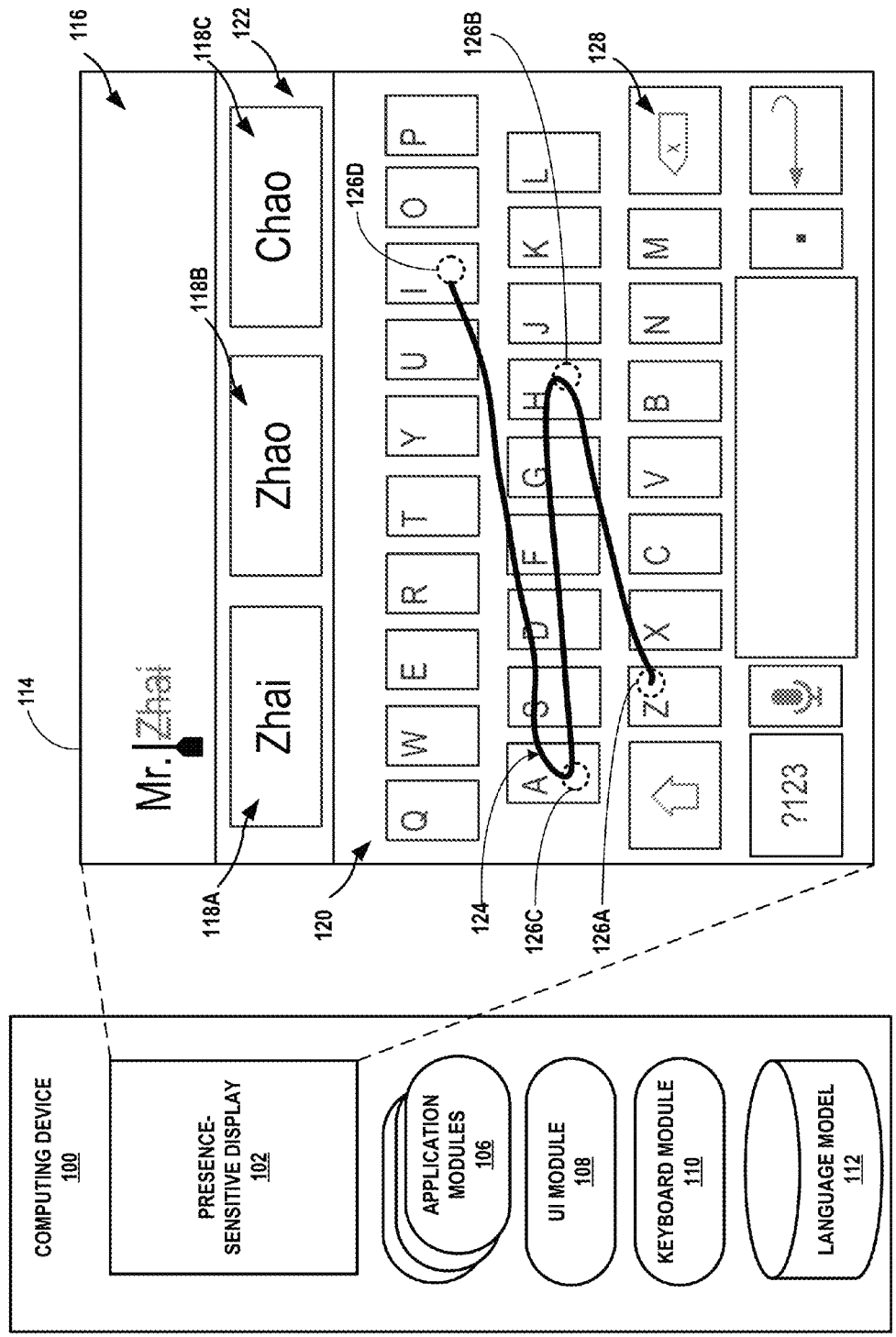
FIG. 1 is a conceptual diagram illustrating an example computing device that is configured to unlearn a new character string in response to a subsequent user input that rejects the new character string, in accordance with one or more aspects of the present disclosure.

FIG. 1 is a conceptual diagram illustrating an example computing device that is configured to unlearn a new character string in response to a subsequent user input that rejects the new character string, in accordance with one or more aspects of the present disclosure. In the example of FIG. 1, computing device 100 may be a mobile phone. However, in other examples, computing device 100 may be a tablet computer, a personal digital assistant (PDA), a laptop computer, a portable gaming device, a portable media player, an e-book reader, a smartwatch, television platform, or another type of computing device.

As shown in FIG. 1, computing device 100 includes presence-sensitive display 102 that is physically integrated with a housing of computing device 100. The housing may, in some examples, be constructed of plastic, aluminum, steel, or any other suitable material. The housing may be a rigid case that encloses and otherwise protects electrical components that provide the functionality of computing device 100.

Presence-sensitive display 102 of computing device 100 may function as an input device and as an output component for computing device 100. In some examples, presence-sensitive display 102 may include an integrated presence-sensitive input component and a display component. For instance, presence-sensitive display 102 may function as a presence-sensitive input component using a presence-sensitive screen, such as a resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology. Presence-sensitive display 102 may function as an output component, such as a display component, using any one or more of a liquid crystal display (LCD), dot matrix display, light emitting diode (LED) display, organic light-emitting diode (OLED) display, e-ink, or similar monochrome or color display capable of outputting visible information to the user of computing device 100. Further details of presence-sensitive display 102 are included in the description of FIG. 2.

Presence-sensitive display 102 may receive indications of the user input by detecting one or more tap and/or non-tap gestures, continuous gestures, or other any touch gestures (e.g., multi-touch gestures) received from a user of computing device 100 (e.g., the user touching or pointing to one or more locations of presence-sensitive display 102 with a finger or a stylus pen). Based on indications of user input, a display component of presence-sensitive display 102 may present output to a user. For instance, a display component of presence-sensitive display 102 may present various user interfaces of applications (e.g., an electronic message application, an Internet browser application) executing at computing device 100. A user of computing device 100 may provide user input at a presence-sensitive input component of presence-sensitive display 102 to interact with one or more of these applications.

Computing device 100 may include application modules 106, user interface module 108, and keyboard module 110. Modules 106, 108, and 110 may perform operations described herein using software, hardware, firmware, or a mixture of both hardware, software, and firmware residing in and executing on computing device 100 or at one or more other remote computing devices. Computing device 100 may execute modules 106, 108, and 110 with one or more processors. Computing device 100 may execute any of modules 106, 108, and 110 as or within a virtual machine executing on underlying hardware. Modules 106, 108, and 110 may be implemented in various ways. For example, any of modules 106, 108, and 110 may be implemented as a downloadable or pre-installed application or "app." In another example, any of modules 106, 108, and 110 may be implemented as part of an operating system of computing device 100.

As shown in FIG. 1, computing device 100 includes one or more application modules 106. Application modules 106 may include functionality to perform any variety of operations on computing device 100. For instance, application modules 106 may include an email application, text messing application, instant messaging application, weather application, video conferencing application, social networking application, weather application, stock market application, emergency alert application, sports application, office productivity application, multimedia player, etc. Although shown as operable by computing device 100, one or more of application modules 106 may be operable by a remote computing device that is communicatively coupled to computing device 100. In such examples, an application module executing at a remote computing device may cause the remote computing device to send information using any suitable form of data communication (e.g., wired or wireless network, short-range wireless communication such as Near Field Communication or Bluetooth, etc.). In some examples, a remote computing device may be a computing device that is separate from computing device 100. For instance, the remote computing device may be operatively coupled to computing device 100 by a network. Examples of a remote computing device may include, but are not limited to a server, smartphone, tablet computing device, smart watch, and desktop computer. In some examples, a remote computing device may not be an integrated component of computing device 100.

Computing device 100 may also include UI module 108. UI module 108 of computing device 100 may receive from presence-sensitive display 102, one or more indications of user input detected at presence-sensitive display 102. Generally, each time presence-sensitive display 102 receives an indication of user input detected at a particular location of presence-sensitive display 102, UI module 108 may receive information about the user input from presence-sensitive display 102. UI module 108 may assemble the information received from presence-sensitive display 102 into a set of events, which may be time-ordered, that are indicative of a gesture, such as a sequence of one or more touch events. Each touch event in the sequence may include data or components that represents parameters (e.g., when, where, originating direction) characterizing a presence and/or movement of input at the presence-sensitive screen. Each touch event in the sequence may include a location component corresponding to a location of presence-sensitive display 102, a time component related to when presence-sensitive display 102 detected user input at the location, and/or an action component related to whether the touch event corresponds to a lift up or a push down at the location.

UI module 108 may determine one or more characteristics of the user input based on the sequence of touch events and include information about these one or more characteristics within each touch event in the sequence of touch events. For example, UI module 108 may determine a start location of the user input, an end location of the user input, a density of a portion of the user input, a speed of a portion of the user input, a direction of a portion of the user input, or a curvature of a portion of the user input, to name only a few examples. One or more touch events in the sequence of touch events may include (in addition to a time, a location, and an action component as described above) a characteristic component that includes information about one or more characteristics of the user input (e.g., a density, a speed, etc.). UI module 108 may transmit, as output to keyboard module 110, the sequence of touch events including the components or parameterized data associated with each touch event.

UI module 108 may act as an intermediary between various components of computing device 100 to make determinations based on input detected by presence-sensitive display 102 and generate output presented by presence-sensitive display 102. For instance, UI module 108 may initially receive, as an input from keyboard module 110, data representing a keyboard layout of the keys included in graphical keyboard 120. UI module 108 may cause presence-sensitive display 102 to output graphical keyboard 120. In response to receiving user input, UI module 108 may transmit, as output to keyboard module 110, a sequence of touch events and/or locations where presence-sensitive display 102 presents each of the keys. Keyboard module 110 may receive the sequence of touch events generated from information about user input detected by presence-sensitive display 102. Keyboard module 110 may determine, based on the location components in the sequence touch events, that one or more location components approximate a selection of one or more keys (e.g., keyboard module 110 may determine the location of one or more of the touch events corresponds to an area of presence-sensitive display 102 that presents graphical keyboard 120). UI module 108 may receive, from keyboard module 110 and based on the selection of one or more keys, one or more character strings, which may be output for display at presence-sensitive display 102. UI module 108 may update graphical user interface 114 to include the one or more character strings. UI module 108 may cause presence-sensitive display 102 to display updated user interface that includes the one or more character strings as text.

In the example of FIG. 1, keyboard module 110 sends data to UI module 108 that causes presence-sensitive display 102 to present example user interface 114. In this example, user interface 114 includes graphical elements displayed at various locations of presence-sensitive display 102. FIG. 1 illustrates edit region 116 of user interface 114, and graphical keyboard 120 of user interface 114. Edit region 116 may include graphical elements such as images, objects, hyperlinks, characters of text, etc. Graphical keyboard 120 includes graphical elements displayed as keys. User interface 114 includes suggested character string regions 118A-118C that include selectable spelling corrections or character string suggestions to replace or add character strings that are included in edit region 116. In the example of FIG. 1, edit region 116 includes graphical elements displayed as characters of text (e.g., a character string). A user of computing device 100 may enter text in edit region 116 by providing user input at locations of presence-sensitive display 102 that display the keys of graphical keyboard 120. In response to user input such as this, computing device 100 may output one or more suggested character strings in suggested character string regions 118A-118C.

In some examples, keyboard module 110 of computing device 100 may transmit, as output to UI module 108 (for inclusion as graphical keyboard 120 of GUI 114) a keyboard layout including a plurality of keys related to one or more written languages (e.g., English, Spanish). Keyboard module 110 may assign one or more characters or operations to each key of the plurality of keys in the keyboard layout. For instance, keyboard module 110 may generate a QWERTY keyboard layout including keys that represent characters used in typing the English language. The QWERTY keyboard layout may also include keys that represent operations used in typing the English language (e.g., backspace, delete, spacebar, enter, etc.).

Keyboard module 110 may receive data from UI module 108 that represents the sequence of touch events generated by UI module 108. Keyboard module 110 may also determine locations of presence-sensitive display 102 where presence-sensitive display 102 presents each of the keys of graphical keyboard 120. Keyboard module 110 may determine, based on the locations of the keys, that the sequence of touch events represents a selection of one or more keys. Keyboard module 110 may send data indicating one or more character strings to UI module 108 for inclusion in user interface 114.

In some examples, keyboard module 110 may use a language model 112 to predict one or more words. Keyboard module 110 may perform a lookup in language model 112 to identify one or more character strings, e.g., words in language model, that include a part of or all of a group of characters associated with keys corresponding to one or more user inputs, such as continuous gestures and/or discrete tap inputs. Language model 112 may implement or store one or more n-grams. An n-gram language model may provide a probability distribution for an item $x_i$ (letter, word, punctuation character or other delimiter) in a contiguous sequence of items based on the previous items in the sequence (i.e., $P(x_i | x_{i-(n-1)}, \ldots, x_{i-1})$). For instance, a character-level bigram language model (an n-gram model where n=2), may provide a probability that the letter "w" follows the sequence of letters "no". In another example, a word-level trigram language model may provide a probability that "fox" follows the word sequence "the quick brown."

Language model 112 of computing device 100 may include a list of character strings, e.g., words, within a written language vocabulary. In some examples, the language model may be based on and/or include a set of character strings based on a dictionary (e.g., that includes a vocabulary of words) stored at computing device 100 or a remote computing device that is accessible by computing device 100. In some examples, the dictionary may include a vocabulary of words. The dictionary may be initialized to include a corpus of the most commonly used character strings in a written or spoken vocabulary when the dictionary is initially installed at the computing device. A vocabulary of words may be a body of words used in a written and/or spoken language. A dictionary may be implemented as a data structure that stores one or more words of a vocabulary in a structured manner. The language model may indicate a likelihood value (e.g., a probability or frequency of occurrence) of each respective character string based on the frequency with which the character string occurs in a given language context. For instance, the character string "door" may be more frequently used in the English language following the character string "the" and therefore associated with a larger likelihood value than, for example, the character string "run" following the character string "the." In some examples, a likelihood value may be an integer or non-integer value.

Keyboard module 110 may use language model 112 to determine a language model score for a character string based on a language context that may include, but is not limited to, e.g., a character corresponding to indication of the gesture performed by the user, character strings in a dictionary and/or previously inputted character strings, etc. For example, keyboard module 110 may determine a group of characters associated with keys corresponding to a gesture. The group of characters may be a prefix or portion of a character string that is included in language model 112. Keyboard module 110 may, in some examples, search or "look ahead" to determine one or more character strings in the language model that correspond respectively to the prefix. For instance, given a character string u-t-a, keyboard module 110 may determine, using the language model, the likelihood value of a character string Utah. Keyboard module 110 may determine a language model score based on likelihood value associated with the character string. Character strings in language model 112 having higher likelihood values in a given language context may have higher scores (or lower costs), wherein a set of character strings with the lowest language model costs may be output for display.

To determine that a sequence of touch events represents a selection of one or more keys, keyboard module 110 may use one or more spatial models (not shown) and/or or more characteristics of a gesture, such as speed, direction, length, curvature, to name only a few examples. In general, a spatial model may generate one or more probabilities that a particular key of a graphical keyboard has been selected by a user based on location data associated with a user input. In some examples, a spatial model includes a bivariate Gaussian model for each key. The bivariate Gaussian model for a key may include a distribution of coordinates (e.g., (x,y) coordinate pairs) that correspond to locations of presence-sensitive display 102 that present the given key. More specifically, in some examples, a bivariate Gaussian model for a key may include a distribution of coordinates that correspond to locations of presence-sensitive display 102 that are most frequently selected by a user when the user intends to select the given key. The shorter the distance between an input location of a user input and a higher density area of a spatial model, the higher the probability that the key associated with the spatial model has been selected. A greater distance between location data of a user input and a higher density area of the spatial model, the lower the probability that the key associated with the spatial model has been selected.

Keyboard module 110 may use one or more spatial models to compare the location components (e.g., coordinates) of one or more touch events in the sequence of touch events to respective locations of one or more keys of graphical keyboard 120 and generate a probability based on these comparisons that a selection of a key occurred. In some examples, keyboard module 110 may generate a spatial model score using one or more spatial models. The spatial model score may indicate a probability of a selected key based at least in part on locations of presence-sensitive display 102 traversed by a gesture.

Although spatial scores have been described with respect to a spatial model, keyboard module 110 may also determine spatial scores based on one or more characteristics of a gesture such as speed, direction, length, curvature of a gesture. For instance, if a portion of a gesture has a high degree of curvature at a particular location, keyboard module 110 may determine that the user has traversed a desired key at the location and is changing direction to select a subsequent key. Therefore, a higher degree of curvature at a particular location may indicate an intended key. Similarly, if a portion of a gesture has a slower speed than other previous portions, keyboard module 110 may determine that the user has reduced the speed of the gesture to more accurately traverse an intended key. Keyboard module 110 may also use direction and/or length of gesture or portion of a gesture in a similar manner to determine which keys a user intended to select. In some examples, keyboard module 110 may use a combination of one or more spatial models and characteristics of a gesture to determine a spatial score.

As keyboard module 110 receives indications of one or more gestures, keyboard module 110 may incrementally determine spatial and language model scores corresponding to character strings. Using the spatial and language model scores, keyboard module 110 may determine a combined score for each character string based on the spatial and language model score for each respective character string. Keyboard module 110 may update the spatial, language, and/or combined scores incrementally as keyboard module 110 determines subsequent indications of gestures. That is, keyboard module 110 may maintain a set of candidate character strings that are based on one or more input contexts and one or more different possible combinations of keys traversed by a user inputs provided by the user. Each candidate character string may have a corresponding combined score. In some examples, keyboard module 110 may output for display a subset of the candidate character strings that have the highest combined scores (e.g., the highest combinations of language and spatial model probabilities, or alternatively, the lowest language and spatial costs). Based on the determined one or more combined scores, keyboard module 110 may perform one or more of a variety of operations including, but not limited to, word prediction, auto-correction, and/or or suggestion techniques.

As further described with reference to FIG. 1, keyboard module 110 may implement techniques to unlearn a new character string in response to a subsequent user input that rejects the new character string. In the example of FIG. 1, computing device 100 outputs, for display, graphical keyboard 120 comprising a plurality of keys. For example, keyboard module 110 may generate data that includes a representation of graphical keyboard 120. UI module 108 may generate user interface 114 and include graphical keyboard 120 in user interface 114 based on the data representing graphical keyboard 120. UI module 108 may send information to presence-sensitive display 102 that includes instructions for displaying user interface 114 at a presence-sensitive screen of presence-sensitive display 102. Presence-sensitive display 102 may receive the information and cause the presence-sensitive screen of presence-sensitive display 102 to present user interface 114 including edit region 116, graphical keyboard 120, and suggested character string regions 118A-118C with character string suggestion bar 122.

In some examples, edit region 116, suggestion bar 122, and graphical keyboard 120 are three non-overlapping regions of user interface 114. In some examples, one or more of edit region 116, graphical keyboard 120, and suggested character string regions 118A-118C with character suggestion bar 122 may overlap with one or more other of edit region 116, graphical keyboard 120, and suggested character string regions 118A-118C with character suggestion bar 122 (e.g., character string suggestion regions 118A-118C may overlap with character string suggestion bar 122).

Computing device 100 may receive an indication of a gesture detected at a location of presence-sensitive display 102, wherein the location corresponds to a location of presence-sensitive display 102 that outputs the graphical keyboard 120. In some examples, the gesture may be a single-tap gesture in which a user's finger is detected a particular location of presence-sensitive display 102 and is subsequently no longer detected by presence-sensitive display 102 upon the user removing the finger from detection by presence-sensitive display 102, and without the user's finger traversing to a different location of presence-sensitive display 102 in the same gesture. In some examples, as in FIG. 1, the gesture may be a continuous gesture in which the user's finger is detected a first location of presence-sensitive display 102, and while the user's finger remains detected by presence-sensitive display 102, the user's finger is detected at one or more locations that are different from the first location (e.g., the user's finger is sliding or otherwise traversing multiple locations of presence-sensitive display 102) before the user removes the finger from detection by presence-sensitive display 102. In some examples, the gesture may be a portion of a larger continuous gesture. The gesture may be an entire, complete continuous gesture from the moment the user's finger is detected by presence-sensitive display 102 until the moment the user's finger is no longer detected by presence-sensitive display 102.

In the example of FIG. 1, while presence-sensitive display 102 outputs user interface 114, a user may perform a gesture user input 124 (or simply "gesture 124") at a region of presence-sensitive display 102 that presents graphical keyboard 120. FIG. 1 illustrates a path of gesture 124 that traverses locations 126A-126D of presence-sensitive display 102. For example, location 126A represents a beginning location of gesture 124 and locations 126B-126D represent additional locations of presence-sensitive display 102 traversed by gesture 124. Each of locations 126 are delimited by dashed circles in FIG. 1 for example purposes, although presence-sensitive display 102 may not output such dashed circles in some examples, and such locations may be larger and/or smaller in various different examples.

As gesture 124 is being detected by presence-sensitive display 102, UI module 108 may receive information indicating gesture 124 from presence-sensitive display 102 and assemble the information into a time-ordered sequence of touch events (e.g., each touch event including a location component, a time component, and an action component). UI module 108 may send the touch events to keyboard module 110. Keyboard module 110 may receive the sequence of touch events along with the information associated with each touch event (e.g., location, time, action, etc.) from UI module 108. That is, UI module 108 may contemporaneously generate the touch events as gesture 124 is detected and send the touch events to keyboard module 110. Accordingly, in some examples, keyboard module 110 may receive time-sampled data that is representative of the touch events.

Keyboard module 110 may determine one or more character strings based on the touch events, language model 112, one or more spatial models, and/or one or more characteristics of the gesture as described above. As described above, keyboard module 110 may determine various candidate strings based on existing character strings that are currently stored in a dictionary. For instance, language model 112 may include n-grams based on the character strings currently stored in the dictionary. A candidate character string from the dictionary may be modeled by keyboard module 110 along a path in a lexicon trie data structure wherein each node of the trie represents a character of the character string and an edge between a first node and second node represents a likelihood that a character of the second node follows a character of the first node. By determining the total value of all the likelihoods of the edges along a path of characters from a starting node to a terminal node, keyboard module 110 may determine the likelihood of the character string for the path. Based on determining the likelihoods of one or more character strings in the lexicon trie, keyboard module 110 may output a set of one or more most probable character strings that have the one or more highest likelihoods as predictions in character string suggestion bar 122.

In some examples, keyboard module 110 may receive one or more indications of user input that do not correspond to a character string stored in the language model 112 at the time the indications of user input are received by computing device 100. For instance, a surname, such as "Zhai" may not be included in a dictionary, and therefore "Zhai" may not be included in language model 112. Keyboard module 110 may determine that based on the user input that the combined score for "Zhai" satisfies a threshold to add Zhai to the dictionary and/or language model 112. For instance, the spatial scores for the characters 'Z', 'H', 'A', 'I' may be significantly higher than other combinations of characters because gesture 30 precisely traverses the 'Z', 'H', 'A', and 'I' keys of graphical keyboard 120. Although the language model score for the character string "Zhai" may be low, the combined score for "Zhai", that is based on the spatial model score and the language model score, may satisfy a threshold (e.g., the combined score is greater than or is equal to the threshold) to add the character string "Zhai" to the dictionary and/or language model 112.

Keyboard module 110 may learn the character string "Zhai" by adding the character string to the dictionary and/or language model 112. For instance, associating the likelihood value with the new character string may include keyboard module 110 storing the new character string in at least one n-gram of language model 112 with a likelihood value, such that the likelihood value corresponds to the n-gram in language model 112. Keyboard module 110 may add a unigram to language model 112 where the character string of the unigram is "Zhai" and the likelihood value of the unigram is equal to an integer value of 1. Keyboard module 110 may also add a bigram to language model 112 where the character string of the bigram is "Mr. Zhai" and the bigram has a corresponding likelihood value equal to an integer value of 1. The value of 1 indicates the number of occurrences that a respective character string has been selected or committed by a user as the desired text in edit region 116. In some examples, a character string may be selected or committed if the user retains the text as part of the text being composed rather than deleting or modifying the character string. For instance, a character string "aim" in the input context "We aim" may be selected or committed if the user does not delete or modify "aim" after inputting "aim" and subsequently inputting "higher" to compose the phrase "We aim higher."

At a later point in time, the user may again provide one or more user inputs to enter text. The user may provide user inputs at presence-sensitive display 102, such as one or more gestures and/or taps, which correspond to the character string "Zhai." Keyboard module 110 may, based at least in part on language model 112, output "Zhai" as a prediction in one or more of edit region 116 and/or character string suggestion bar 122 if the combined score for "Zhai" is in a set of candidate character strings having combined scores that are greater than combined scores of any other candidate character strings not included in the set.

Responsive to receiving user input, if "Zhai" is predicted by keyboard module 110 and selected or committed by the user as the desired text in edit region 116, keyboard module 110 may increase the likelihood value in the unigram that corresponds to the character string "Zhai." For instance, keyboard module 110 may increment the likelihood value by an increment value (or magnitude). The increment value may an integer value (e.g., 1), a fractional value, or any suitable value, which may be user-defined, hard-coded, and/or adaptively changed. If the input context included "Mr." as preceding "Zhai" when "Zhai" was selected or committed by the user as the desired text in edit region 116, then keyboard module 110 may increase the likelihood value in the bigram that corresponds to the character string "Mr. Zhai." In this way, keyboard module 110 may perform learning to update and maintain likelihood values in language model 112 that are based on a user's decision to select or commit a character string.

At a time after incrementing the likelihood value for "Zhai", keyboard module 110 may receive one or more indications of user input at user interface 114 that cause keyboard module 110 to again determine and output for display the character string "Mr." and subsequently "Zhai", as shown in FIG. 1. Keyboard module 110 may, based on the indication of user input, determine respective combined scores for "Zhai", "Zhao", and "Chao". For instance, keyboard module 110 may order character strings in word suggestion regions 118 from left to right in decreasing order of likelihood. However, the user may have intended to enter "Zhao" rather than "Zhai." To correct the text "Zhai" to "Zhao", the user may provide a user input to reject the character string "Zhai." That is, keyboard module 110 may receive one or more indications of user input that reject the new character string. As shown in FIG. 1, the one or more indications of user input may include multiple selections of the backspace key 128 that result in the deletion of characters "Zhai" in edit region 116. In some examples, such as shown in FIG. 1, text "Zhai" may temporarily be displayed at presence-sensitive display 102 with strikethrough formatting to indicate the deletion before being removed from display, while in other examples the characters "Zhai" may be removed from display at presence-sensitive display 102 as the backspace key 128 is selected.

In response to receiving the one or more indications of user input to reject "Zhai", keyboard module 110 may decrement at least one likelihood value associated with at least one n-gram that includes the character string "Zhai". Keyboard module 110 may decrement the at least one likelihood value by a decrement value (or magnitude), where the decrement value may an integer value (e.g., 1), a fractional value, or any suitable value, which may be user-defined, hard-coded, and/or adaptively changed. For instance, keyboard module 110 may decrement the likelihood value in the unigram that includes "Zhai." Keyboard module 110 may also decrement the likelihood value in the bigram that includes "Mr. Zhai" because the bigram includes the character string "Zhai", which was corrected by the user to "Zhao." Further details of changing the likelihood value and indications of user input to reject a character string are described with respect to FIG. 2.

After decrementing at least one likelihood value for an n-gram associated with "Zhai", keyboard module 110 may receive an indication of user input that is similar to or the same as gesture 124. Keyboard module 110 may, based on the indication of user input, determine respective combined scores for "Zhai", "Zhao", and "Chao". However, because keyboard module 110 previously decreased the likelihood value of "Zhai", based on the user's previous selection of "Zhao" and rejection of "Zhai", keyboard module 110 may determine that "Zhao" has a higher combined score than "Zhai." As such, keyboard module 110 may output "Zhao" in edit region 116 and/or output "Zhao" in suggestion bar 122 as the most likely character string. Therefore, keyboard module 110 may output "Zhao" in the left-most word suggestion region 118A and "Zhai" may be in the middle word suggestion region 118B. By adaptively unlearning "Zhai" based on the indication of user input to reject the character string, "Zhai" may still be included as a character string for suggestion (and e.g., and still included in the dictionary and/or language model), but may be displayed by presence-sensitive display 102 as a less likely character string.

As shown in FIG. 1, UI module 108 may update suggested character string regions 118A-118C by including the three highest ranking candidate character strings as suggested character strings, as gesture 124 is being performed by a user. From user interface 114, the user can select a character string from suggested character string regions 118A-118C by tapping or providing an input at a location of presence-sensitive display 102 where presence-sensitive display 102 outputs suggested character string regions 118A-118C. For example, the user may select a suggested character string region by tapping or gesturing over the location of presence-sensitive display 102 where presence-sensitive display 102 presents a suggested character string, e.g., "Zhao." Selecting suggested character string region 118B may cause UI module 108 to update user interface 114 and include character string "Zhao" in edit region 116.

Figure 2:
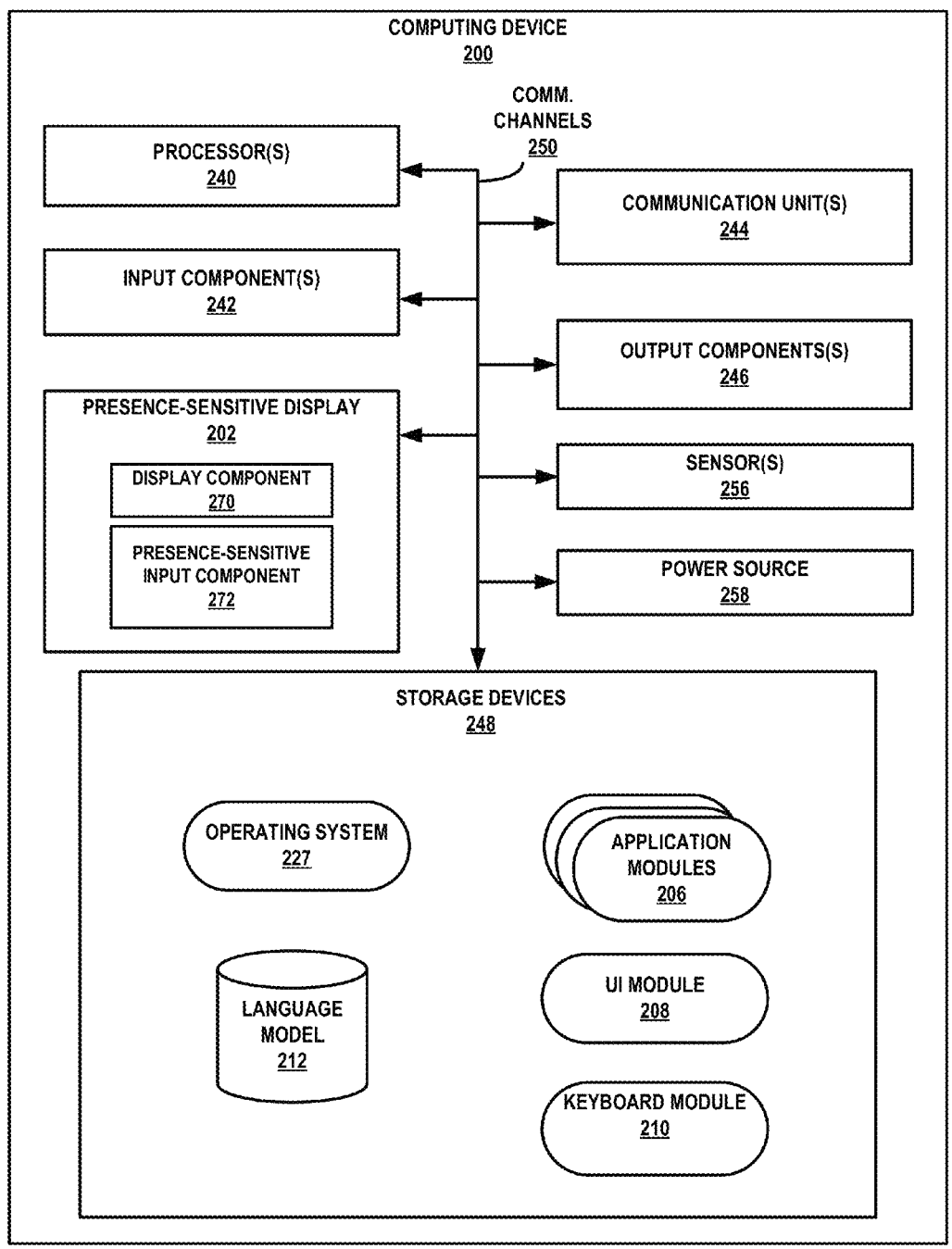
FIG. 2 is a block diagram illustrating an example computing device, in accordance with one or more aspects of the present disclosure.

FIG. 2 is a block diagram illustrating an example computing device, in accordance with one or more aspects of the present disclosure. FIG. 2 illustrates only one particular example of computing device 200 (as also illustrated at computing device 100 in FIG. 1). Many other examples of computing device 200 may be used in other instances and may include a subset of the components included in example computing device 200 or may include additional components not shown example computing device 200 in FIG. 2.

As shown in the example of FIG. 2, computing device 200 includes one or more processors 240, one or more input components 242, one or more communication units 244, one or more output components 246, one or more storage devices 248, and presence-sensitive display 202. Storage devices 248 of computing device 200 also include UI module 208, application modules 206, operating system 227, language model 212, and keyboard module 210. Communication channels 250 may interconnect each of the components 206, 208, 210, 212, 227, 240, 242, 244, 246, 248, 256, 258, 270, and 272 for inter-component communications (physically, communicatively, and/or operatively).

In some examples, communication channels 250 may include a system bus, a network connection, one or more inter-process communication data structures, or any other components for communicating data between hardware and/or or software.

One or more processors 240 may implement functionality and/or execute instructions within computing device 200. For example, processors 240 on computing device 200 may receive and execute instructions stored by storage devices 248 that provide the functionality of UI module 208, application modules 206, operating system 227, language model 212 and keyboard module 210. These instructions executed by processors 240 may cause computing device 200 to store and/or modify information, within storage devices 248 during program execution. Processors 240 may execute instructions of UI module 208, application modules 206, operating system 227, language model 212 and keyboard module 210 to perform one or more operations. That is, UI module 208, application modules 206, operating system 227, language model 212 and keyboard module 210 may be operable by processors 240 to perform various functions described herein.

One or more input components 242 of computing device 200 may receive input. Examples of input are tactile, audio, kinetic, and optical input, to name only a few examples. Input components 242 of computing device 200, in one example, include a mouse, keyboard, voice responsive system, video camera, buttons, control pad, microphone or any other type of device for detecting input from a human or machine. In some examples, input component 242 may be a presence-sensitive input component, which may include a presence-sensitive screen, touch-sensitive screen, etc.

One or more output components 246 of computing device 200 may generate output. Examples of output are tactile, audio, and video output. Output components 246 of computing device 200, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output.

In some examples, presence-sensitive display 202 of computing device 200 may include functionality of input component 242 and/or output components 246. In the example of FIG. 2, presence-sensitive display 202 may include a presence-sensitive input component 272, such as a presence-sensitive screen or touch-sensitive screen. In some examples, presence-sensitive input component 272 may detect an object at and/or near the presence-sensitive input component. As one example range, presence-sensitive input component 272 may detect an object, such as a finger or stylus that is within two inches or less of presence-sensitive input component 272. Presence-sensitive input component 272 may determine a location (e.g., an (x,y) coordinate) of the presence-sensitive input component at which the object was detected. In another example range, presence-sensitive input component 272 may detect an object two inches or less from presence-sensitive input component 272 and other ranges are also possible. Presence-sensitive input component 272 may determine the location of presence-sensitive input component 272 selected by a user's finger using capacitive, inductive, and/or optical recognition techniques.

In some examples, presence-sensitive display 202 may also provide output to a user using tactile, audio, or video stimuli as described with respect to output component 246. For instance, presence-sensitive display 202 may include display component 270 that presents a graphical user interface. Display component 270 may be any type of output component that provides visual output, such as described with respect to output components 246. While illustrated as an integrated component of computing device 200, presence-sensitive display 202 may, in some examples, be an external component that shares a data path with other components of computing device 200 for transmitting and/or receiving input and output. For instance, presence-sensitive display 202 may be a built-in component of computing device 200 located within and physically connected to the external packaging of computing device 200 (e.g., a screen on a mobile phone). In another example, presence-sensitive display 202 may be an external component of computing device 200 located outside and physically separated from the packaging of computing device 200 (e.g., a monitor, a projector, etc. that shares a wired and/or wireless data path with a tablet computer). In some examples, presence-sensitive display 202, when located outside of and physically separated from the packaging of computing device 200, may be implemented by two separate components: a presence-sensitive input component 272 for receiving input and a display component 270 for providing output.

One or more communication units 244 of computing device 200 may communicate with external devices by transmitting and/or receiving data. For example, computing device 200 may use communication units 244 to transmit and/or receive radio signals on a radio network such as a cellular radio network. In some examples, communication units 244 may transmit and/or receive satellite signals on a satellite network such as a Global Positioning System (GPS) network. Examples of communication units 244 include a network interface card (e.g. such as an Ethernet card), an optical transceiver, a radio frequency transceiver, a GPS receiver, or any other type of device that can send and/or receive information. Other examples of communication units 244 may include Bluetooth®, GPS, 3G, 4G, and Wi-Fi® radios found in mobile devices as well as Universal Serial Bus (USB) controllers and the like.

One or more storage devices 248 within computing device 200 may store information for processing during operation of computing device 200. In some examples, storage device 248 is a temporary memory, meaning that a primary purpose of storage device 248 is not long-term storage. Storage devices 248 on computing device 200 may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 248, in some examples, also include one or more computer-readable storage media. Storage devices 248 may be configured to store larger amounts of information than volatile memory. Storage devices 248 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 248 may store program instructions and/or data associated with UI module 208, application modules 206, operating system 227, language model 212 and keyboard module 210.

As shown in FIG. 2, computing device 200 may include one or more sensors 256. Sensors 256 may include an accelerometer that generates accelerometer data. Accelerometer data may indicate an acceleration and/or a change in acceleration of computing device 200. Sensors 256 may include a gyroscope that generates gyroscope data. Gyroscope data may indicate a physical orientation and/or change in physical orientation of computing device 200. In some examples, the orientation may be relative to one or more reference points. Sensors 256 may include a magnetometer that generates magnetometer data. Magnetometer data may indicate the magnetization of an object that is touching or in proximity to computing device 200. Magnetometer data may indicate the Earth's magnetic field, and in some examples, provide directional functionality of a compass. Sensors 256 may include an ambient light sensor that generates ambient light data. The ambient light data may indicate an intensity of light to which computing device 200 is exposed. Sensors 256 may include a proximity sensor that generates proximity data. Proximity data may indicate whether an object is within proximity to computing device 200. In some examples, proximity data may indicate how close an object is to computing device 200. In some examples, sensors 256 may include a clock that generates a date and time. The date and time may be a current date and time.

As shown in FIG. 2, computing device 200 may include a power source 258. In some examples, power source 258 may be a battery. Power source 258 may provide power to one or more components of computing device 200. Examples of power source 258 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 258 may have a limited capacity (e.g., 1000-3000 mAh).

In accordance with techniques of the disclosure, computing device 200 may include one or more processors 240 and at least one keyboard module 210, operable by one or more processors 240 to output, a graphical keyboard. Responsive to keyboard module 210 receiving an indication of a first input detected at a location of presence-sensitive input component 272, determining, based at least in part on the indication of the first input, a new character string that is not included in a dictionary or language model. The location of the presence-sensitive input component 272 may correspond to a location of the output component, such as display component 270. Keyboard module 210 may add the new character string to the dictionary or language model and associate a likelihood value with the character string. Responsive to receiving an indication of a second input detected at a location of presence-sensitive input component 272, keyboard module 210 may predict the character string in response second indication of user input. Responsive to receiving an indication of a third input that rejects the new character string, decreasing the likelihood value associated with the new character string.

As described in this disclosure, text entry methods (i.e., mobile keyboards) may adapt to the user, learning new words from the user's contacts, typing history, personal content (emails, social, chat, and the like). For example, if a user frequently types the phrase "cu soon", keyboard module 210 may learn the abbreviation "cu" (if keyboard module 210 has not learned it already) and suggest "soon" in response to the user typing "cu". However, adaptively adding new words to a dictionary may present a tradeoff between two conflicting goals: (1) learning new words and phrases quickly, after determining the word only a few instances (or even just one instance) and (2) minimizing risk of learning the "wrong" word or phrase, e.g., accidentally learning a typo or misspellings (like "birthday" for the intended word "birthday") and adding the typo or misspelling to a dictionary or learning a word that interferes with another, more popular word, such as "AMD" vs "and."

In some keyboards, when a user reverts a character string suggestion, the computing device may remove the word entirely from its adaptive language model. However, this may be too simple and/or too aggressive, which can lead to overforgetting (e.g., removal) of valid (or frequent) words. Some keyboards may provide a distractor filter. A distractor filter may prevent learning of new words that are "too close" or to similar to known words (and thus likely to be typos or misspellings). For instance a distractor filter may prevent a valid character string (like "AMD") from being learned even if it is very relevant to the user because of its similarity to "and". A distractor filter, however, may not prevent other types of unwanted words from being learned. Some keyboards may allow a user to long press on an outputted word to have the option of removing it from the language model entirely, but this feature is not readily discoverable and may not permit gradual unlearning of character strings.

Techniques of this disclosure present a reinforcement learning approach to adapting a language model based on user behavior. In some examples, the techniques may learn new words and phrases not already included in a dictionary or language model of computing device 200 when there is a positive indication from the user to select the word or phrase. In this way, the techniques of this disclosure may allow learning of new character strings to be faster and more aggressive due to the improved unlearning ability. As such, learning "mistakes" (e.g., character strings not intended by a user) may be quickly corrected, even without explicit instructions from the user in some examples.

Keyboard module 210 may unlearn words (e.g., remove the word from the dictionary, remove the word from the language model, decrease the likelihood value to zero or null, to name only a few examples of unlearning) upon receiving a negative indication from the user in response to outputting the word. Examples of a negative indication or indication of a rejection may include but are not limited to: deleting a word, rejecting a suggested word (either by selecting an alternative from the suggestion bar, ignoring the suggested word, backspacing after an autocorrection); or manually indication that a word is not wanted, to name only a few examples.

In some examples, keyboard module 110 may perform unlearning of character strings according to a particular rate or magnitude given one or more indications of user input. The rate or magnitude may be an integer or non-integer and may be hardcoded, user-defined, or adaptable based on one or more criteria (e.g., speed of user input, input context, number of times the character string has been rejected, to name only a few examples of one or more criteria). Keyboard module 110 may unlearn words gradually (or quickly) as keyboard module 110 accumulates more indications of user input to reject a character string, rather than completely forgetting the character string the first time there is a user input to reject the character string. In some examples, if keyboard module 210 adds a new character string to a dictionary and/or language model and then the user subsequently rejects the character string immediately the first time that keyboard module 210 has predicted or output the new character string, keyboard module 210 may forget the word because the likelihood value was 1 and was decreased to 0 based on the rejection.

In some examples, keyboard module 210 may take phrase or input context into consideration when unlearning a character string (e.g., "aim") or phrase that includes a group of character strings ("we aim"). In some examples, techniques of the disclosure may unlearn words for a corresponding phrase or input context. For example, techniques of the disclosure may only unlearn "AMD" for the bigram "this AMD" when the previous word is "this", but not for the bigram "from AMD" because the input context includes "this" but not "from". More generally, keyboard module 210 may update a likelihood value associated with a character string for only the particular input context.

In some examples, keyboard module 210 may adapt the rate or magnitude of learning/unlearning for particular behavior detected by keyboard module 210. For instance, some actions detected by keyboard module 210 may cause keyboard module 210 to perform faster unlearning than others (e.g., speed of user input, input context, number of times the character string has been rejected, to name only a few examples). In some examples, if unlearning unintended words quickly is a strong goal, the unlearning rate or magnitude of keyboard module 210 may be much greater than the learning rate or magnitude.

In an example of techniques of this disclosure, keyboard module 210 may immediately unlearn a typo or misspelling. For instance, a user may mistype "birthday" as "bjrtjdy" and forget or not bother to correct it. As such, keyboard module 210 may learn "bjrtjdy" by adding "bjrtjdy" to one or more of a dictionary and/or language model 212. At a later time, the user may again mistype "birthday" as "birtjdy". Keyboard module 210 may suggest newly learned word "bjrtjdy", which is output for display by presence-sensitive display 202. However, in this instance, the user provides a user input to reject the suggestion and types "birtjdy" again. In this instance, keyboard module 210 suggests "birthday", which is output for display, since keyboard module 210 has unlearned "bjrtjdy."

In some examples, techniques of the disclosure may gradually unlearn a popular personalized word or new character string that keyboard module 210 previously added to a dictionary or language model based on one or more user inputs. For instance, a user may frequently type the movie title "Gattaca". Keyboard module 210 may learn "Gattaca" with a high probability. The user may subsequently input "Gattaca". Keyboard module 210 may suggest the newly learned word "Gattaca". The user may reject the suggestion "Gattaca" and type "Inception" instead. In response to the user's rejection, keyboard module 210 may reduce the probability for "Gattaca", but not remove it entirely, for example by decrementing the likelihood value for Gattaca. The user may then input "Gattaca" again. Keyboard module 210 may still suggest "Gattaca". The use may subsequently reject "Gattaca" in multiple subsequent instances of "Gattaca" being suggested and/or output for display. For each successive rejection of "Gattaca", keyboard module 210 continues reducing the likelihood value for "Gattaca" until keyboard module 210 removes this word from language model 212 or its likelihood value is otherwise set to zero or null. When the user subsequently provides input similar to "Gattaca", keyboard module 210 may suggest the nearest alternative to the character string "Gattaca" because "Gattaca" was removed or is otherwise indicated as unused in the language model.

Some conventional keyboards may immediately forget or remove a popular personalized word entirely from a dictionary and/or language model. For instance, in a conventional keyboard, a user may frequently type the movie title "Gattaca". The conventional keyboard may eventually learn "Gattaca" with a high probability. The user may subsequently gesture "Gattaca" and the conventional keyboard suggests the learned word "Gattaca". However, in this particular instance, the user may reject the suggestion Gattaca and type "Inception" instead. The conventional keyboard may completely forget or remove the word "Gattaca", such that when the user provides a subsequent gesture for "Gattaca" again, the conventional keyboard fails to suggest "Gattaca". As such, the conventional keyboard may not gradually unlearn the character, in contrast to techniques of this disclosure.

Keyboard module 210 may adapt an n-gram language model, such as language model 212, based on positive and negative reinforcement. For instance, keyboard module 210 may use n-grams of language model 212 to store non-personalized and personalized language models, so as to provide for adapting an n-gram language model to positive and negative reinforcement. In some instances, techniques of this disclosure may be applied to other (non n-gram based) language models.

As shown in Table 1, keyboard module 210 may include the following examples of initial n-gram model likelihood values. The following Table 1 illustrates accumulated the counts or likelihood values of n-grams from sentences, where a, b, and c represent individual words:

TABLE 1

| unigrams | bigrams | trigrams |
|---|---|---|
| #(a) = 3 | #(a b) = 1 | #(a b a) = 1 |
| #(b) = 1 | #(b a) = 1 | #(b a c) = 1 |
| #(c) = 2 | #(a c) = 2 | |

For instance, the bigram #(a b)=1 indicates a likelihood value of 1 for word 'b' following word 'a'.

Keyboard module 210 may compute conditional probabilities from n-grams in the following Equation 1:

$$p(b|a)=p(a,b)/p(a)=\#(a,b)/\#(a) \quad (1)$$

Keyboard module 210 may use language model 212 to compute p(b|a), and in some examples, incrementally as touch events are generated by UI module 208. For instance, keyboard module 210 may compute the following examples for a unigram in Equation 2 and bigrams in Equations 3-4, respectively:

$$p(a)=\#(a)/(\#(a)+\#(b)+\#(c))=3/6 \quad (2)$$

$$p(b|a)=\#(a\ b)/\#(a)=1/3 \quad (3)$$

$$p(c|a)=\#(a\ c)/\#(a)=2/3 \quad (4)$$

To illustrate an example of learning, a user may start a new document or begin typing in a text edit region of a user interface and accept or commit the suggestion provided by keyboard module 210 for word (a). Accordingly, keyboard module 210 may increment the count or likelihood value for unigram (a) from 3→4 as shown in Table 2

TABLE 2

| unigrams | bigrams | trigrams |
|---|---|---|
| #(a) = 3 → 4 | #(a b) = 1 | #(a b a) = 1 |
| #(b) = 1 | #(b a) = 1 | #(b a c) = 1 |
| #(c) = 2 | #(a c) = 2 | |

In accordance with techniques of the disclosure, keyboard module 210 may also perform unlearning. For example, a user may start a new document or begin typing in a text edit region of a user interface and reject a suggestion provided by keyboard module 210 for word (a). In an example approach of techniques of this disclosure, keyboard module 210 may decrement a count or likelihood value for unigram (a) from 3→1. By decrementing the likelihood value for unlearning by twice the amount of incrementing for learning, keyboard module 210 may apply strong negative reinforcement such that unlearning rate or magnitude is 2× learning rate, as described in the previous learning example. Keyboard module 210 may therefore apply an unlearning rate or magnitude that is different than the learning rate or magnitude. For instance, the learning rate (or magnitude) could be greater than the unlearning rate (or magnitude) or less than the unlearning rate (magnitude). Since keyboard module 210 has decremented unigram (a) by 2× the learning rate of 1, the conditional probabilities for bigrams and trigrams that include (a) may sum to more than 1.0, e.g. in bigrams as expressed in Equations 5-6:

$$p(b|a)=\#(a\ b)/\#(a)=1/1=1.0(?) \quad (5)$$

$$p(c|a)=\#(a\ c)/\#(a)=2/1=2.0(?) \quad (6)$$

In accordance with techniques of this disclosure, keyboard module 210 may adjust one or more n-grams to avoid a higher-order n-gram (e.g., bigram) having a higher likelihood value than a lower-order n-gram (e.g. unigram). A higher-order n-gram may include more words than a lower-order n-gram. In one example, keyboard module 210 may remove any higher-order child n-grams (a, . . . ), such as #(a b), (a b), and (a b a) when the likelihood value for the higher-order child n-gram is greater than the unigram #(a). Keyboard module 210 may, in some examples, update higher-order child n-gram likelihood values to be less than or equal to the lower-order child n-gram likelihood values. In another example, keyboard module 210 may distribute the decrement in count or likelihood value across the higher-order n-grams as shown in Table 3, when the user rejects (a) in an input context for unigram #(a):

TABLE 3

| unigrams | bigrams | trigrams |
|---|---|---|
| #(a) = 3 → 1 | #(a b) = 1 → 0 | #(a b a) = 1 → 0 |
| #(b) = 1 | #(b a) = 1 | #(b a c) = 1 |
| #(c) = 2 | #(a c) = 2 → 0 | |

For instance, keyboard module 210 may decrement likelihood values for child n-grams #(a b), #(a b), and #(a b a) if the user rejects (a) when (a) is the only character string in the input context. By removing any higher-order child n-grams when the likelihood value for the higher-order child n-gram is greater than the unigram #(a) or distributing the decrement in count or likelihood value across the higher-order n-grams, keyboard module 210 may avoid a higher-order n-gram (e.g., bigram) having a higher likelihood value than a lower-order n-gram (e.g. unigram).

In another example of unlearning, in accordance with techniques of the disclosure, a user may start a new document or begin typing in a text edit region of a user interface and reject a suggestion provided by keyboard module 210 for word (a). Keyboard module 210 may increment a separate "rejection-count" for unigram (a) from 0→1, as shown in Table 4:

TABLE 4

| unigrams | bigrams | trigrams |
|---|---|---|
| #(a) = 3 (1) | #(a b) = 1 (0) | #(a b a) = 1 (0) |
| #(b) = 1 (0) | #(b a) = 1 (0) | #(b a c) = 1 (0) |
| #(c) = 2 (0) | #(a c) = 2 (0) | |

In some examples, if keyboard module 210 calculates the conditional probability for (a), keyboard module 210 may reduce the "acceptance-count" or likelihood value by the "rejection-count". That is, when computing p(b|a)=#(a b)/#(a), for example, keyboard module 210 may calculate (acceptance−count(#(a b))−rejection-count((#(a b))/(acceptance-count(#(a))−rejection-count((#(a)). By storing separate rejection-counts, keyboard module 210 may track the total amount of negative feedback provided by user for a particular word or character string, rather than incrementing/decrementing a single likelihood value.

In another example of unlearning, a user may start a new document or begin typing in a text edit region of a user interface, which includes words (b, a, c) and in which the user provides a user input that deletes or rejects the last entered word (c) of words (b, a, c). Responsive to receiving an indication of the rejection or deletion, keyboard module 210 may decrement counts or likelihood values for all n-grams involving the last term in the sequence (b, a, c). In this way, keyboard module 210 may provide weak negative reinforcement, such that unlearning rate is 1× learning rate, as illustrated in Table 5 and through the following operations:

Decrement count for trigram #(b a c) from 1→0
Decrement count for bigram #(a c) from 2→1
Decrement count for unigram #(c) from 2→1

TABLE 5

| unigrams | bigrams | trigrams |
|---|---|---|
| #(a) = 3 | #(a b) = 1 | #(a b a) = 1 |
| #(b) = 1 | #(b a) = 1 | #(b a c) = 1 → 0 |
| #(c) = 2 → 1 | #(a c) = 2 → 1 | |

In some examples, as a result of the foregoing decrement operations, keyboard module 210 may perform unlearning with respect to (c) when the input context is (b, a), as illustrated in Equations 7 and 8, but not perform unlearning for any other input contexts.

$$p(c|b,a)=0/1=0 \quad (7)$$

$$p(c|a)=1/3=0.33 \quad (8)$$

As described in this disclosure, keyboard module 210 may receive one or more indications of input that reject a character string to provide negative reinforcement for unlearning. Examples of such indications that reject a character string include deleting a character string that was previously inputted by the user immediately following the inputting of the character string. In such an example of a character string being immediately deleted by the user following the inputting of the character string, keyboard module 210 may determine this to be a stronger indication of intent by the user, i.e., immediately typing a replacement word. As such, in some examples, keyboard module 210 may apply a larger rate of unlearning based on this stronger form of negative reinforcement.

As described in this disclosure, keyboard module 210 may determine a variety of different rejections of a new character string. In some examples, one or more indications of input that reject a character string may include deleting a sequence of words. In some examples, one or more indications of input that reject a character string may include an indication of the user picking a different word from the suggestion bar of a user interface, e.g., ignoring the word suggestion by selecting another word, or ignoring the word altogether. In some examples, one or more indications of input that reject a character string may include an indication of the user cancelling an auto-correction of a character string performed by keyboard module 210. In some examples, cancelling an auto-correction of a character string may include an indication of user input that by presses the backspace key immediately after the auto-correction. In some examples, one or more indications of input that reject a character string may include an indication of the user correcting a character string inputted by the user using the spellchecker.

As described in this disclosure, keyboard module 210 may receive one or more indications of input that provide positive reinforcement for a character string for learning. In some examples, one or more indications of input that provide positive reinforcement for a character string include a user typing or gesturing a word. In some examples, one or more indications of input that provide positive reinforcement for a character string include picking a suggestion from the suggestion bar. In some examples, one or more indications of input that provide positive reinforcement for a character string include learning the word from external sources (e.g., contacts, messages, etc).

In some examples, an input context may include one or more previously inputted characters and/or character strings that were typed by a user. For instance, when composing a message, a user may have previously typed "We aim", which may be included as part of the input context to determine "We aim high." Therefore, "high" may be predicted or otherwise determined based on the input context "We aim." In some examples, an input context may include an identity of a user of the computing device, a geolocation of the computing device, an environment and/or climate of the computing device, audio and/or visual information determined by the computing device, sensor information detected by the computing device, type of input field for which text is entered by user, an application for which text is entered by user, recipient of text entered by user, to name only a few examples. Techniques of this disclosure may provide for adaptive unlearning of character strings on a per-input context basis. In such examples of per-input context unlearning, keyboard module 210 may decrease the likelihood value for a character string based on the particular input context, rather than decreasing the likelihood value for the character string in all input contexts. Keyboard module 210 may adjust rates of learning and unlearning based on input context. For instance, keyboard module 210 may adjust a rate or magnitude of learning or unlearning higher or lower for different respective input contexts.

Figure 3:
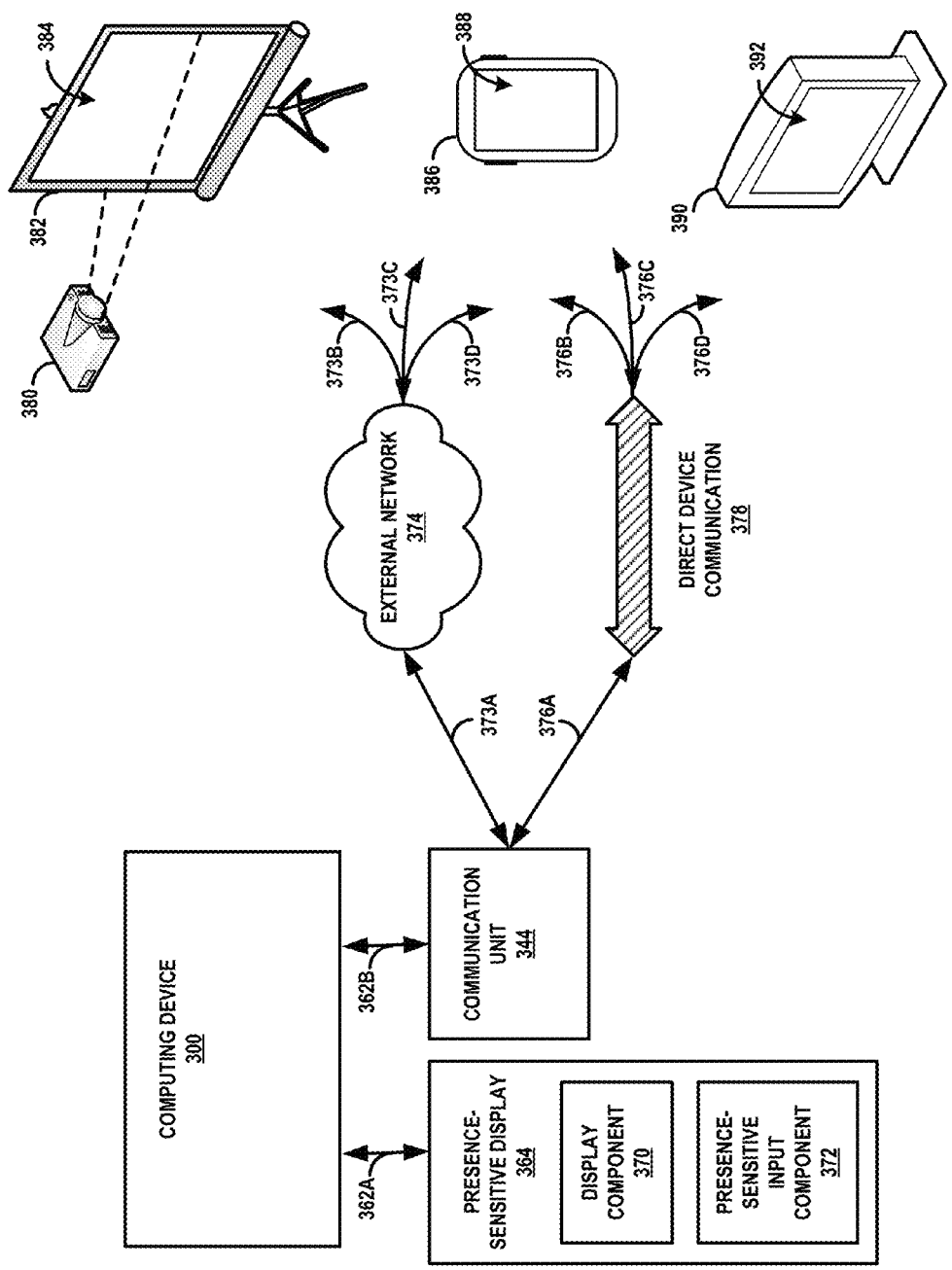
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, to name only a few examples. The example shown in FIG. 3 includes a computing device 300, a presence-sensitive display 302, communication unit 344, projector 380, projector screen 382, mobile device 386, and visual display component 390. In some examples, presence-sensitive display 302 may be a presence-sensitive display as described in FIGS. 1-2. Although shown for purposes of example in FIGS. 1 and 2 as a stand-alone computing device 100, a computing device such as computing device 300 may, generally, be any component or system that includes a processor or other suitable computing environment for executing software instructions and, for example, need not include a presence-sensitive display.

As shown in the example of FIG. 3, computing device 300 may be a processor that includes functionality as described with respect to processors 240 in FIG. 2. In such examples, computing device 300 may be operatively coupled to presence-sensitive display 302 by a communication channel 362A, which may be a system bus or other suitable connection. Computing device 300 may also be operatively coupled to communication unit 344, further described below, by a communication channel 362B, which may also be a system bus or other suitable connection. Although shown separately as an example in FIG. 3, computing device 300 may be operatively coupled to presence-sensitive display 302 and communication unit 344 by any number of one or more communication channels.

In other examples, such as illustrated previously by computing device 100 in FIGS. 1-2, a computing device may refer to a portable or mobile device such as mobile phones (including smart phones), laptop computers, etc. In some examples, a computing device may be a desktop computer, tablet computer, smart television platform, camera, personal digital assistant (PDA), server, or mainframes.

Presence-sensitive display 302 may include display component 370 and presence-sensitive input component 372. Display component 370 may, for example, receive data from computing device 300 and display the graphical content. In some examples, presence-sensitive input component 372 may determine one or more user inputs (e.g., continuous gestures, multi-touch gestures, single-touch gestures) at presence-sensitive display 302 using capacitive, inductive, and/or optical recognition techniques and send indications of such user input to computing device 300 using communication channel 362A. In some examples, presence-sensitive input component 372 may be physically positioned on top of display component 370 such that, when a user positions an input unit over a graphical element displayed by display component 370, the location at which presence-sensitive input component 372 corresponds to the location of display component 370 at which the graphical element is displayed.

As shown in FIG. 3, computing device 300 may also include and/or be operatively coupled with communication unit 344. Communication unit 344 may include functionality of communication unit 244 as described in FIG. 2. Examples of communication unit 344 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 300 may also include and/or be operatively coupled with one or more other devices (e.g., input devices, output components, memory, storage devices) that are not shown in FIG. 3 for purposes of brevity and illustration.

FIG. 3 also illustrates a projector 380 and projector screen 382. Other such examples of projection devices may include electronic whiteboards, holographic display components, and any other suitable devices for displaying graphical content. Projector 380 and projector screen 382 may include one or more communication units that enable the respective devices to communicate with computing device 300. In some examples, the one or more communication units may enable communication between projector 380 and projector screen 382. Projector 380 may receive data from computing device 300 that includes graphical content. Projector 380, in response to receiving the data, may project the graphical content onto projector screen 382. In some examples, projector 380 may determine one or more user inputs (e.g., continuous gestures, multi-touch gestures, single-touch gestures) at projector screen using optical recognition or other suitable techniques and send indications of such user input using one or more communication units to computing device 300. In such examples, projector screen 382 may be unnecessary, and projector 380 may project graphical content on any suitable medium and detect one or more user inputs using optical recognition or other such suitable techniques.

Projector screen 382, in some examples, may include a presence-sensitive display 384. Presence-sensitive display 384 may include a subset of functionality or all of the functionality of presence-sensitive display 102 and/or 302 as described in this disclosure. In some examples, presence-sensitive display 384 may include additional functionality. Projector screen 382 (e.g., an electronic whiteboard), may receive data from computing device 300 and display the graphical content. In some examples, presence-sensitive display 384 may determine one or more user inputs (e.g., continuous gestures, multi-touch gestures, single-touch gestures) at projector screen 382 using capacitive, inductive, and/or optical recognition techniques and send indications of such user input using one or more communication units to computing device 300.

Although techniques of the disclosure have been described with respect to n-grams, the techniques could also be applied to other implementations. For instance, techniques of the disclosure may be used when word prediction is performed using language models implemented with neural networks, such as regular neural networks, recurrent neural networks, Long-Short Term Memories (LSTMs), or any other types of online learning. Another example may include retaining raw word/phrase counts instead of decomposing these values into n-grams. In such examples, the raw word/phrase counts may be used with k-nearest-neighbor search to find matches between words and user inputs.

FIG. 3 also illustrates mobile device 386 and visual display component 390. Mobile device 386 and visual display component 390 may each include computing and connectivity capabilities. Examples of mobile device 386 may include e-reader devices, convertible notebook devices, hybrid slate devices, etc. Examples of visual display component 390 may include other semi-stationary devices such as televisions, computer monitors, etc. As shown in FIG. 3, mobile device 386 may include a presence-sensitive display 388. Visual display component 390 may include a presence-sensitive display 392. Presence-sensitive displays 388, 392 may include a subset of functionality or all of the functionality of presence-sensitive display 102 and/or 302 as described in this disclosure. In some examples, presence-sensitive displays 388, 392 may include additional functionality. In any case, presence-sensitive display 392, for example, may receive data from computing device 300 and display the graphical content. In some examples, presence-sensitive display 392 may determine one or more user inputs (e.g., continuous gestures, multi-touch gestures, single-touch gestures) at projector screen using capacitive, inductive, and/or optical recognition techniques and send indications of such user input using one or more communication units to computing device 300.

As described above, in some examples, computing device 300 may output graphical content for display at presence-sensitive display 302 that is coupled to computing device 300 by a system bus or other suitable communication channel. Computing device 300 may also output graphical content for display at one or more remote devices, such as projector 380, projector screen 382, mobile device 386, and visual display component 390. For instance, computing device 300 may execute one or more instructions to generate and/or modify graphical content in accordance with techniques of the present disclosure. Computing device 300 may output the data that includes the graphical content to a communication unit of computing device 300, such as communication unit 344. Communication unit 344 may send the data to one or more of the remote devices, such as projector 380, projector screen 382, mobile device 386, and/or visual display component 390. In this way, computing device 300 may output the graphical content for display at one or more of the remote devices. In some examples, one or more of the remote devices may output the graphical content at a presence-sensitive display that is included in and/or operatively coupled to the respective remote devices.

In some examples, computing device 300 may not output graphical content at presence-sensitive display 302 that is operatively coupled to computing device 300. In other examples, computing device 300 may output graphical content for display at both a presence-sensitive display 302 that is coupled to computing device 300 by communication channel 362A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 300 and output for display at presence-sensitive display 302 may be different than graphical content display output for display at one or more remote devices.

Computing device 300 may send and receive data using any suitable communication techniques. For example, computing device 300 may be operatively coupled to external network 374 using network link 373A. Each of the remote devices illustrated in FIG. 3 may be operatively coupled to network external network 374 by one of respective network links 373B, 373C, or 373D. External network 374 may include network hubs, network switches, network routers, etc., that are operatively inter-coupled thereby providing for the exchange of information between computing device 300 and the remote devices illustrated in FIG. 3. In some examples, network links 373A-373D may be Ethernet, ATM or other network connections. Such connections may be wireless and/or wired connections.

In some examples, computing device 300 may be operatively coupled to one or more of the remote devices included in FIG. 3 using direct device communication 378. Direct device communication 378 may include communications through which computing device 300 sends and receives data directly with a remote device, using wired or wireless communication. That is, in some examples of direct device communication 378, data sent by computing device 300 may not be forwarded by one or more additional devices before being received at the remote device, and vice-versa. Examples of direct device communication 378 may include Bluetooth, Near-Field Communication, Universal Serial Bus, WiFi, infrared, etc. One or more of the remote devices illustrated in FIG. 3 may be operatively coupled with computing device 300 by communication links 376A-376D.

In some examples, communication links 376A-376D may be connections using Bluetooth, Near-Field Communication, Universal Serial Bus, infrared, etc. Such connections may be wireless and/or wired connections.

In accordance with techniques of the disclosure, computing device 300 may output a graphical keyboard, for display at presence-sensitive display 392 of visual display component 390. For instance, computing device 300 may send data that represents the graphical keyboard to communication unit 344. Communication unit 344 may send the data via external network 374 or direct device communication 378 to visual display component 390. Visual display component 390 may cause presence-sensitive display 392 to output the graphical keyboard for display.

Presence-sensitive display 392 may detect a first user input (e.g., one or more taps and/or gestures) that corresponds to a character string. Visual display component 390 may send data indicating the first user input via external network to computing device 300, which initially receives the data from communication unit 344. Responsive to receiving this indication of a first input detected at a location of a presence-sensitive display 392 operatively coupled to computing device 300, determining, based at least in part on the indication of the first input, a new character string that is not included in a dictionary or language model. In some examples, the dictionary or language model may be stored at computing device 300 and/or at a remote computing device.

Computing device 300 may add the new character string to the dictionary and associate a likelihood value with the new character string. Presence-sensitive display 392 may detect a second user input (e.g., one or more taps and/or gestures) that corresponds to the character string added to the dictionary. Visual display component 390 may send data indicating the second user input via external network to computing device 300, which initially receives the data from communication unit 344. Responsive to receiving this indication of a second input, computing device 300 may predict the new character string. In some examples, computing device 300 may send data to visual display component 390 that causes presence-sensitive display 392 to output the new character string for display.

Presence-sensitive display 392 may detect a third user input (e.g., one or more taps and/or gestures) that rejects the new character string. Visual display component 390 may send data indicating the third user input via external network to computing device 300, which initially receives the data from communication unit 344. Responsive to receiving this indication of a third user input, computing device 300 may decrease the likelihood value associated with the new character string.

Figure 4:
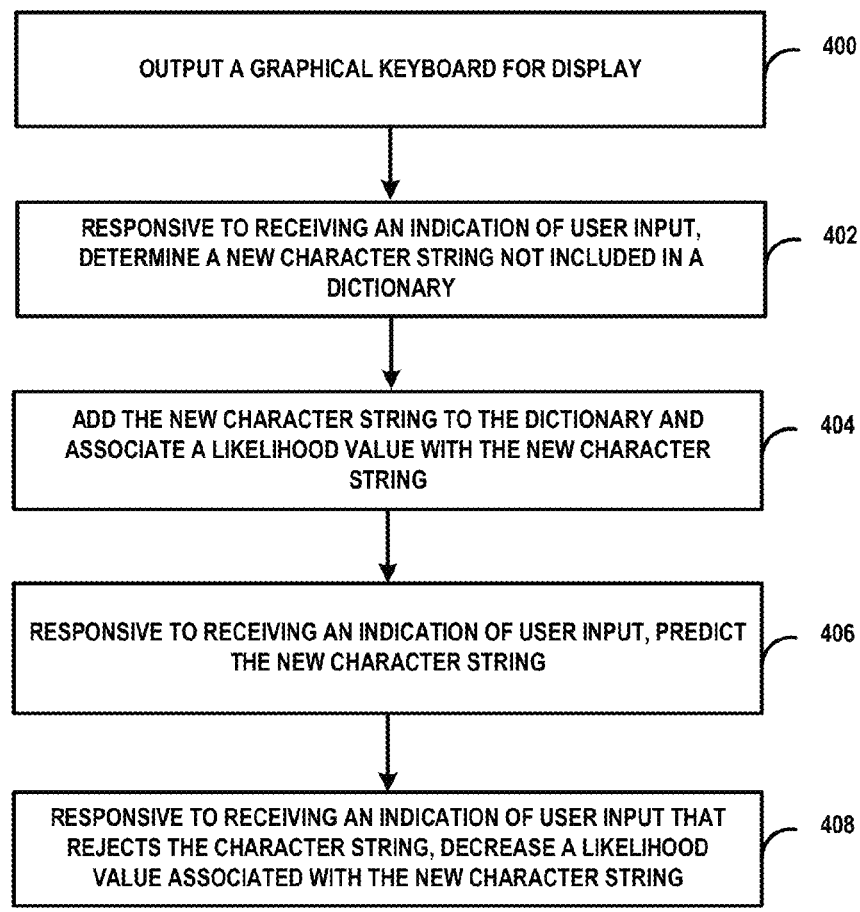
FIG. 4 is a flowchart illustrating example operations of a computing device that is configured to unlearn a new character string in response to a subsequent user input that rejects the new character string, in accordance with one or more aspects of the present disclosure.

FIG. 4 is a flowchart illustrating example operations of a computing device that is configured to unlearn a new character string in response to a subsequent user input that rejects the new character string, in accordance with one or more aspects of the present disclosure. For purposes of illustration, the example operations are described below within the context of computing device 100, as shown in FIG. 1.

In FIG. 4, computing device 100 may output (400), for display at an output component operatively coupled to the computing device, a graphical keyboard. Computing device 100 may, responsive to receiving an indication of a first input detected at a location of a presence-sensitive input component operatively coupled to computing device 100, determine (402), based at least in part on the indication of the first input, a new character string that is not included in a dictionary or language model, wherein the location of the presence-sensitive input component corresponds to a location of the output component. Computing device 100 may add (404) the new character string to the dictionary or language model and associate a likelihood value with the new character string. Computing device 100 may, responsive to receiving an indication of a second input detected at a location of the presence-sensitive input component, predict (406) the new character string. Computing device 100 may, responsive to receiving an indication of a third input that rejects the new character string, decrease (408) the likelihood value associated with the new character string.

Figure 5:
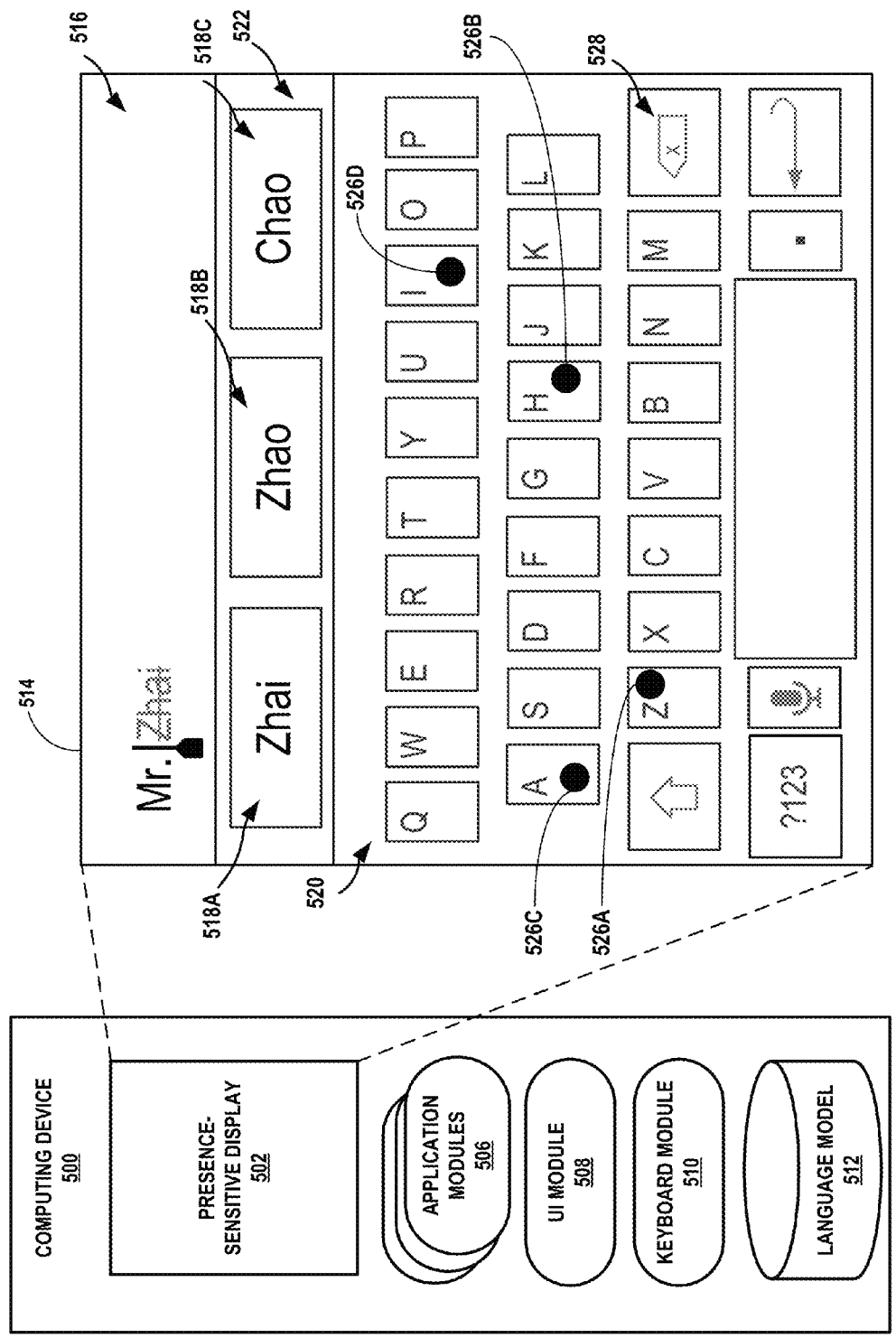
FIG. 5 is a conceptual diagram illustrating an example computing device that is configured to unlearn a new character string in response to a subsequent user input that rejects the new character string, in accordance with one or more aspects of the present disclosure.

FIG. 5 is a conceptual diagram illustrating an example computing device 500 that is configured to unlearn a new character string in response to a subsequent user input that rejects the new character string, in accordance with one or more aspects of the present disclosure. FIG. 5 illustrates unlearning techniques of this disclosure for tap inputs, in contrast to FIG. 1, which illustrates unlearning techniques with a continuous gesture. Like-named and liked numbered elements of FIG. 5 (e.g., language model 512 and language model 112, or computing device 500 and computing device 100, as two examples) may include the same or similar functionality as the elements described in FIG. 1.

Computing device 500 may receive a set of discrete tap user inputs detected at locations 526A-526D of presence-sensitive display 502, wherein each location corresponds to a location of presence-sensitive display 502 that outputs the graphical keyboard 520. Each of locations 526 are illustrated by solid circles in FIG. 5 for example purposes, although presence-sensitive display 502 may not output such sold circles in some examples, and such locations may be larger and/or smaller in various different examples.

As the sequence of tap gestures is being detected by presence-sensitive display 502, UI module 508 may receive information indicating the tap gestures from presence-sensitive display 502 and assemble the information into a time-ordered sequence of touch events (e.g., each touch event including a location component, a time component, and an action component). UI module 508 may send the touch events to keyboard module 510. Keyboard module 510 may receive the sequence of touch events along with the information associated with each touch event (e.g., location, time, action, etc.) from UI module 508.

Keyboard module 510 may determine one or more character strings based on the touch events, language model 512, one or more spatial models, and/or one or more characteristics of the tap gestures. As described in FIG. 1, keyboard module 510 may determine various candidate strings based on existing character strings that are currently stored in a dictionary and/or language model 512. Based on determining the likelihoods of one or more character strings, such as based on combined scores of language model and spatial model scores, keyboard module 510 may output a set of one or more most probable character strings that have the one or more highest likelihoods as predictions in character string suggestion bar 522.

In FIG. 5, keyboard module 510 may receive one or more indications of user input that do not correspond to a character string stored in the language model 512 at the time the indications of user input are received by computing device 500. As in FIG. 5, a surname, such as "Zhai" may not be included in a dictionary or language model 512. Keyboard module 510 may determine based on the user input that the combined score for "Zhai" satisfies a threshold to add Zhai to the dictionary and/or language model 512.

Keyboard module 510 may learn the character string "Zhai" by adding the character string to the dictionary and/or language model 512. Keyboard module 110 may also add a unigram to language model 512 where the character string of the unigram is "Zhai" and the likelihood value of the unigram is equal to an integer value of 1. Keyboard module 510 may also add a bigram to language model 512 where the character string of the bigram is "Mr. Zhai" and the bigram has a corresponding likelihood value equal to an integer value of 1. The value of 1 indicates the number of occurrences that a respective character string has been selected or committed by a user as the desired text in edit region 516.

At a later point in time, the user may again provide one or more user inputs to enter text. The user may provide user inputs at presence-sensitive display 502, such as one or more gestures and/or taps, which correspond to the character string "Zhai." Keyboard module 510 may, based at least in part on language model 512, output "Zhai" as a prediction in one or more of edit region 516 and/or character string suggestion bar 522 if the combined score for "Zhai" is in a set of candidate character strings having combined scores that are greater than combined scores of any other candidate character strings not included in the set.

Responsive to receiving user input, if "Zhai" is predicted by keyboard module 510 and selected or committed by the user as the desired text in edit region 516, keyboard module 510 may increase the likelihood value in the unigram that corresponds to the character string "Zhai." For instance, keyboard module 510 may increment the likelihood value by an increment value. The increment value may an integer value (e.g., 1), a fractional value, or any suitable value, which may be user-defined, hard-coded, and/or adaptively changed. If the input context included "Mr." as preceding "Zhai" when "Zhai" was selected or committed by the user as the desired text in edit region 516, then keyboard module 510 may increase the likelihood value in the bigram that corresponds to the character string "Mr. Zhai." In this way, keyboard module 510 may perform learning to update and maintain likelihood values in language model 112 that are based on a user's decision to select or commit a character string.

At a time after incrementing the likelihood value for "Zhai", keyboard module 510 may receive one or more indications of user input at user interface 514 that cause keyboard module 510 to again determine and output for display the character string "Mr." and subsequently "Zhai", as shown in FIG. 5. Keyboard module 510 may, based on the indication of user input, determine respective combined scores for "Zhai", "Zhao", and "Chao". For instance, keyboard module 510 may order character strings in word suggestion regions 518 from left to right in decreasing order of likelihood. However, the user may have intended to enter "Zhao" rather than "Zhai." To correct the text "Zhai" to "Zhao", the user may provide a user input to reject the character string "Zhai." That is, keyboard module 510 may receive one or more indications of user input that reject the new character string. As shown in FIG. 5, the one or more indications of user input may include multiple selections of the backspace key 528 that result in the deletion of characters "Zhai" in edit region 516. In some examples, such as shown in FIG. 5, text "Zhai" may temporarily be displayed at presence-sensitive display 502 with strikethrough formatting to indicate the deletion before being removed from display, while in other examples the characters "Zhai" may be removed from display at presence-sensitive display 502 as the backspace key 528 is selected.

In response to receiving the one or more indications of user input to reject "Zhai", keyboard module 510 may decrement at least one likelihood value associated with at least one n-gram that includes the character string "Zhai". Keyboard module 510 may decrement the at least one likelihood value by a decrement value, where the decrement value may an integer value (e.g., 1), a fractional value, or any suitable value, which may be user-defined, hard-coded, and/or adaptively changed. For instance, keyboard module 510 may decrement the likelihood value in the unigram that includes "Zhai." Keyboard module 510 may also decrement the likelihood value in the bigram that includes "Mr. Zhai" because the bigram includes the character string "Zhai", which was corrected by the user to "Zhao."

After decrementing at least one likelihood value for an n-gram associated with "Zhai", keyboard module 110 may receive a subsequent sequence of tap inputs that is similar to or the same the sequence of tap inputs corresponding to locations 526. Keyboard module 510 may, based on the indication of user input, determine respective combined scores for "Zhai", "Zhao", and "Chao". However, because keyboard module 510 previously decreased the likelihood value of "Zhai", based on the user's previous selection of "Zhao" and rejection of "Zhai", keyboard module 510 may determine that "Zhao" has a higher combined score than "Zhai." As such, keyboard module 510 may output "Zhao" in edit region 516 and/or output "Zhao" in suggestion bar 522 as the most likely character string. Therefore, keyboard module 110 may output "Zhao" in the left-most word suggestion region 518A and "Zhai" may be in the middle word suggestion region 518B. By adaptively unlearning "Zhai" based on the indication of user input to reject the character string, "Zhai" may still be included as a character string for suggestion (and e.g., and still included in the dictionary and/or language model), but may be displayed by presence-sensitive display 102 as a less likely character string.

As shown in FIG. 5, UI module 508 may update suggested character string regions 518A-518C by including the three highest ranking candidate character strings as suggested character strings, as the sequence of tap inputs are being performed by a user. From user interface 514, the user can select a character string from suggested character string regions 518A-518C by tapping or providing an input at a location of presence-sensitive display 502 where presence-sensitive display 502 outputs suggested character string regions 518A-518C. For example, the user may select a suggested character string region by tapping or gesturing over the location of presence-sensitive display 502 where presence-sensitive display 502 presents a suggested character string, e.g., "Zhao." Selecting suggested character string region 518B may cause UI module 508 to update user interface 514 and include character string "Zhao" in edit region 516.

EXAMPLE 1

A method comprising: outputting, by a computing device and for display at an output component operatively coupled to the computing device, a graphical keyboard; responsive to receiving an indication of a first input detected at a location of a presence-sensitive input component operatively coupled to the computing device, determining, based at least in part on the indication of the first input, a new character string that is not included in a language model, wherein the location of the presence-sensitive input component corresponds to a location of the output component; adding the new character string to the language model and associating a likelihood value with the new character string; responsive to receiving an indication of a second input detected at a second location of the presence-sensitive input component, predicting the new character string; and responsive to receiving an indication of a third input that rejects the new character string, decreasing the likelihood value associated with the new character string.

EXAMPLE 2

The method of Example 1, wherein associating the likelihood value with the new character string comprises storing the new character string in at least one n-gram of the language model with the likelihood value, such that the likelihood value corresponds to the n-gram in the language model, the method further comprising: responsive to receiving the indication of the third input that rejects the new character string: determining a plurality of n-grams in the language model that include the new character string; and decreasing a respective likelihood value that corresponds to each respective n-gram of the plurality of n-grams.

EXAMPLE 3

The method of any of Examples 1-2, further comprising: responsive to determining that a first likelihood value that corresponds a higher-order n-gram of the language model is greater than a second likelihood value that corresponds to a lower-order n-gram, modifying the language model to at least: remove the higher-order n-gram, or update the first likelihood value to be less than or equal to the second likelihood value, wherein the higher-order n-gram includes more character strings than the lower-order n-gram.

EXAMPLE 4

The method of any of Examples 1-3, wherein decreasing the likelihood value associated with the new character string further comprises decreasing the likelihood value associated with the new character string without removing the new character string from the language model.

EXAMPLE 5

The method of any of Examples 1-4, further comprising: determining a particular input context when predicting the new character string, wherein the particular input context comprises one or more previously inputted character strings that are outputted for display when predicting the new character string, wherein decreasing the likelihood value associated with the new character string comprises decreasing the likelihood value associated with the new character string for only the particular input context.

EXAMPLE 6

The method of any of Examples 1-5, further comprising: determining a particular input context when predicting the new character string, wherein decreasing the likelihood value associated with the new character string comprises decreasing the likelihood value associated with the new character string at a rate or magnitude that is based at least in part on the input context.

EXAMPLE 7

The method of any of Examples 1-6, wherein a rate or magnitude of increasing a likelihood value that corresponds to the new character string in response to learning the new character string is different than a rate or magnitude of decreasing the likelihood value in response to unlearning the new character string.

EXAMPLE 8

The method of any of Examples 1-7, wherein the third input that rejects the new character string comprises an input that: deletes the new character string; deletes a sequence of character strings that includes the new character string; ignores the new character string; cancels an auto-correction of the new character string; or corrects the new character string using a spell-checker.

EXAMPLE 9

The method of any of Examples 1-8, wherein each of the first and second inputs comprise at least one of a discrete tap gesture or a portion of a continuous gesture.

EXAMPLE 10

A computing device comprising: one or more computer processors; an output component; a presence-sensitive input component; and a memory comprising instructions that when executed by the one or more computer processors cause the one or more computer processors to: output, for display at the output component, a graphical keyboard; responsive to receiving an indication of a first input detected at a location of the presence-sensitive input component, determine, based at least in part on the indication of the first input, a new character string that is not included in a language model, wherein the location of the presence-sensitive input component corresponds to a location of the output component; add the new character string to the language model and associate a likelihood value with the new character string; responsive to receiving an indication of a second input detected at a second location of the presence-sensitive input component, predict the new character string; and responsive to receiving an indication of a third input that rejects the new character string, decrease the likelihood value associated with the new character string.

EXAMPLE 11

The computing device of Example 10, wherein the memory comprises instructions that when executed by the one or more computer processors cause the one or more computer processors to: store the new character string in at least one n-gram of the language model with the likelihood value, such that the likelihood value corresponds to the n-gram in the language model; and responsive to receiving the indication of the third input that rejects the new character string: determine a plurality of n-grams in the language model that include the new character string; and decrease a respective likelihood value that corresponds to each respective n-gram of the plurality of n-grams.

EXAMPLE 12

The computing device of any of Examples 10-11, wherein the memory comprises instructions that when executed by the one or more computer processors cause the one or more computer processors to: responsive to determining that a first likelihood value that corresponds a higher-order n-gram of the language model is greater than a second likelihood value that corresponds to a lower-order n-gram, modify the language model to at least: remove the higher-order n-gram, or update the first likelihood value to be less than or equal to the second likelihood value, wherein the higher-order n-gram includes more character strings than the lower-order n-gram.

EXAMPLE 13

The computing device of any of Examples 10-12, wherein the memory comprises instructions that when executed by the one or more computer processors cause the one or more computer processors to: decrease the likelihood value associated with the new character string without removing the new character string from the language model.

EXAMPLE 14

The computing device of any of Examples 10-13, wherein the memory comprises instructions that when executed by the one or more computer processors cause the one or more computer processors to: determine a particular input context when predicting the new character string, wherein the particular input context comprises one or more previously inputted character strings that are outputted for display when predicting the new character string; and decrease the likelihood value associated with the new character string for only the particular input context.

EXAMPLE 15

The computing device of any of Examples 10-14, wherein each of the first and second inputs comprise at least one of a discrete tap gesture or a portion of a continuous gesture.

EXAMPLE 16

A non-transitory computer-readable storage medium encoded with instructions that, when executed, cause at least one processor of a computing device to: output, for display at an output component operatively coupled to the computing device, a graphical keyboard; responsive to receiving an indication of a first input detected at a location of a presence-sensitive input component operatively coupled to the computing device, determine, based at least in part on the indication of the first input, a new character string that is not included in a language model, wherein the location of the presence-sensitive input component corresponds to a location of the output component; add the new character string to the language model and associate a likelihood value with the new character string; responsive to receiving an indication of a second input detected at a second location of the presence-sensitive input component, predict the new character string; and responsive to receiving an indication of a third input that rejects the new character string, decrease the likelihood value associated with the new character string.

EXAMPLE 17

The non-transitory computer-readable storage medium of Example 16 encoded with instructions that, when executed, cause the at least one processor of the computing device to: store the new character string in at least one n-gram of the language model with the likelihood value, such that the likelihood value corresponds to the n-gram in the language model; and responsive to receiving the indication of the third input that rejects the new character string: determine a plurality of n-grams in the language model that include the new character string; and decrease a respective likelihood value that corresponds to each respective n-gram of the plurality of n-grams.

EXAMPLE 18

The non-transitory computer-readable storage medium of any of Example 16-17 encoded with instructions that, when executed, cause the at least one processor of the computing device to: responsive to determining that a first likelihood value that corresponds a higher-order n-gram of the language model is greater than a second likelihood value that corresponds to a lower-order n-gram, modify the language model to at least: remove the higher-order n-gram, or update the first likelihood value to be less than or equal to the second likelihood value, wherein the higher-order n-gram includes more character strings than the lower-order n-gram.

EXAMPLE 19

The non-transitory computer-readable storage medium of any of Examples 16-18 encoded with instructions that, when executed, cause the at least one processor of the computing device to: decrease the likelihood value associated with the new character string without removing the new character string from the language model.

EXAMPLE 20

The non-transitory computer-readable storage medium of any of Examples 16-19 encoded with instructions that, when executed, cause the at least one processor of the computing device to: determine a particular input context when predicting the new character string, wherein the particular input context comprises one or more previously inputted character strings that are outputted for display when predicting the new character string, and decrease the likelihood value associated with the new character string for only the particular input context.

EXAMPLE 21

The non-transitory computer-readable storage medium of any of Examples 16-20, wherein each of the first and second inputs comprise at least one of a discrete tap gesture or a portion of a continuous gesture.

EXAMPLE 22

An apparatus comprising: means for outputting, for display at an output component operatively coupled to the computing device, a graphical keyboard; means for, responsive to receiving an indication of a first input detected at a location of a presence-sensitive input component operatively coupled to the apparatus, determining, based at least in part on the indication of the first input, a new character string that is not included in a language model, wherein the location of the presence-sensitive input component corresponds to a location of the output component; means for adding the new character string to the language model and associating a likelihood value with the new character string; means for, responsive to receiving an indication of a second input detected at a second location of the presence-sensitive input component, predicting the new character string; and means for, responsive to receiving an indication of a third input that rejects the new character string, decreasing the likelihood value associated with the new character string.

EXAMPLE 23

The apparatus of Example 22 comprising means for performing the method of any of Examples 1-9.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

What is claimed is:

1. A method comprising:
   outputting, by a computing device and for display at an output component operatively coupled to the computing device, a graphical user interface that includes a text edit region and a graphical keyboard;
   receiving, by the computing device, an indication of a first input detected at a first location of a presence-sensitive input component operatively coupled to the computing device, wherein the first location of the presence-sensitive input component corresponds to a region of the output component at which the graphical keyboard is displayed;
   determining, by the computing device, based at least in part on the indication of the first input, a new character string that is not included in a language model of the computing device;
   adding, by the computing device, to the language model, the new character string and a corresponding likelihood value associated with the new character string;
   receiving, by the computing device, an indication of a second input detected at a second location of the presence-sensitive input component, wherein the second location of the presence-sensitive input component corresponds to the region of the output component at which the graphical keyboard is displayed;
   predicting, based on the indication of the second input and the likelihood value associated with the new character string, the new character string and an input context associated with the second input;
   responsive to predicting the new character string, outputting, by the computing device, for display within the text edit region, the new character string;
   receiving, by the computing device, an indication of a third input detected at a third location of the presence-sensitive input component, wherein the third location of the presence-sensitive input component corresponds to the region of the output component at which the graphical keyboard is displayed; and
   responsive to determining that the third input deletes the new character string from the text input region after being output for display:
      removing, by the computing device, from the text input region, the new character string; and
      decreasing, by the computing device, at a rate or magnitude that is adapted to the input context, the likelihood value associated with the new character string without removing the new character string from the language model.

2. The method of claim 1, wherein associating the likelihood value with the new character string comprises storing the new character string in at least one n-gram of the language model with the likelihood value, such that the likelihood value corresponds to the at least one n-gram in the language model, the method further comprising:
   responsive to determining that the third input deletes the new character string:
   determining a plurality of n-grams in the language model that include the new character string; and
   decreasing a respective likelihood value that corresponds to each respective n-gram of the plurality of n-grams.

3. The method of claim 2, further comprising:
   responsive to determining that a first likelihood value that corresponds a higher-order n-gram of the language model is greater than a second likelihood value that corresponds to a lower-order n-gram, modifying the language model to at least:
      remove the higher-order n-gram, or
      update the first likelihood value to be less than or equal to the second likelihood value,
   wherein the higher-order n-gram includes more character strings than the lower-order n-gram.

4. The method of claim 1, further comprising:
   wherein the input context comprises one or more previously inputted character strings that are outputted for display when predicting the new character string,
   wherein decreasing the likelihood value associated with the new character string comprises decreasing the likelihood value associated with the new character string for only the input context.

5. The method of claim 1, wherein a rate or magnitude of increasing the likelihood value that corresponds to the new character string in response to learning the new character string is different than the rate or magnitude that is adapted to the input context.

6. The method of claim 1, further comprising:
   after decreasing the likelihood value associated with the new character string, receiving, by the computing device, an indication of a fourth input detected at a fourth location of the presence-sensitive input component, wherein the fourth location of the presence-sensitive input component corresponds to the region of the output component at which the graphical keyboard is displayed;
   responsive to predicting, based on the indication of the fourth input and the likelihood value associated with the new character string, the new character string, outputting, by the computing device, for display within the text edit region, the new character string;
   receiving, by the computing device, an indication of a fifth input detected at a fifth location of the presence-sensitive input component, wherein the fifth location of the presence-sensitive input component corresponds to the region of the output component at which the graphical keyboard is displayed; and responsive to determining that the fifth input deletes the new character string from the text edit region after being output for display:
removing, by the computing device, from the text input region, the new character string; and
decreasing, by the computing device, the likelihood value associated with the new character string without removing the new character string from the language model.

7. The method of claim 1, further comprising:
after decreasing the likelihood value associated with the new character string and responsive to determining that the likelihood value is a zero or null value, removing, by the computing device, the new character string from the language model.

8. A computing device comprising:
one or more computer processors;
an output component;
a presence-sensitive input component; and
a memory comprising instructions that when executed cause the one or more computer processors to:
output, for display at the output component, a graphical user interface that includes a text edit region and a graphical keyboard;
receive an indication of a first input detected at a first location of the presence-sensitive input component, wherein the first location of the presence-sensitive input component corresponds to a region of the output component at which the graphical keyboard is displayed;
determine, based at least in part on the indication of the first input, a new character string that is not included in a language model of the computing device;
add, to the language model, the new character string and a corresponding likelihood value associated with the new character string;
receive an indication of a second input detected at a second location of the presence-sensitive input component, wherein the second location of the presence-sensitive input component corresponds to the region of the output component at which the graphical keyboard is displayed;
predict, based on the indication of the second input and the likelihood value associated with the new character string, the new character string and an input context associated with the second input;
responsive to predicting the new character string, output, for display within the text edit region, the new character string;
receive an indication of a third input detected at a third location of the presence-sensitive input component, wherein the third location of the presence-sensitive input component corresponds to the region of the output component at which the graphical keyboard is displayed; and
responsive to determining that the third input deletes the new character string from the text edit region after being output for display:
remove, from the text input region, the new character string; and
decrease, at a rate or magnitude that is adapted to the input context, the likelihood value associated with the new character string without removing the new character string from the language model.

9. The computing device of claim 8, wherein the memory comprises instructions that when executed by the one or more computer processors cause the one or more computer processors to:
store the new character string in at least one n-gram of the language model with the likelihood value, such that the likelihood value corresponds to the at least one n-gram in the language model; and
responsive to determining that the third input deletes the new character string:
determine a plurality of n-grams in the language model that include the new character string; and
decrease a respective likelihood value that corresponds to each respective n-gram of the plurality of n-grams.

10. The computing device of claim 9, wherein the memory comprises instructions that when executed by the one or more computer processors cause the one or more computer processors to:
responsive to determining that a first likelihood value that corresponds a higher-order n-gram of the language model is greater than a second likelihood value that corresponds to a lower-order n-gram, modify the language model to at least:
remove the higher-order n-gram, or
update the first likelihood value to be less than or equal to the second likelihood value,
wherein the higher-order n-gram includes more character strings than the lower-order n-gram.

11. The computing device of claim 8,
wherein the input context comprises one or more previously inputted character strings that are outputted for display when predicting the new character string; and
the memory comprises instructions that when executed by the one or more computer processors cause the one or more computer processors to decrease the likelihood value associated with the new character string for only the input context.

12. The computing device of claim 8, wherein each of the first and second inputs comprise at least one of a discrete tap gesture or a portion of a continuous gesture.

13. The computing device of claim 8, wherein the memory comprises instructions that when executed by the one or more computer processors cause the one or more computer processors to:
after decreasing the likelihood value associated with the new character string, receive an indication of a fourth input detected at a fourth location of the presence-sensitive input component, wherein the fourth location of the presence-sensitive input component corresponds to the region of the output component at which the graphical keyboard is displayed;
responsive to predicting, based on the indication of the fourth input and the likelihood value associated with the new character string, the new character string, output, for display within the text edit region, the new character string;
receive an indication of a fifth input detected at a fifth location of the presence-sensitive input component, wherein the fifth location of the presence-sensitive input component corresponds to the region of the output component at which the graphical keyboard is displayed;
responsive to determining that the fifth input deletes the new character string from the text edit region after being output for display:
remove, from the text input region, the new character string; and decrease the likelihood value associated with the new character string without removing the new character string from the language model; and after decreasing the likelihood value associated with the new character string responsive to determining that the fifth input rejects the new character string after being output for display and responsive to determining that the likelihood value is a zero or null value, remove the new character string from the language model.

14. A non-transitory computer-readable storage medium encoded with instructions that, when executed, cause at least one processor of a computing device to:

output, for display at an output component operatively coupled to the computing device, a graphical user interface that includes a text edit region and a graphical keyboard;

receiving an indication of a first input detected at a first location of a presence-sensitive input component operatively coupled to the computing device, wherein the first location of the presence-sensitive input component corresponds to a region of the output component at which the graphical keyboard is displayed;

determine, based at least in part on the indication of the first input, a new character string that is not included in a language model of the computing device;

add, to the language model, the new character string and a corresponding likelihood value associated with the new character string;

responsive to receiving an indication of a second input detected at a second location of the presence-sensitive input component, wherein the second location of the presence-sensitive input component corresponds to the region of the output component at which the graphical keyboard is displayed;

predict, based on the indication of the second input and the likelihood value associated with the new character string, the new character string and an input context associated with the second input;

responsive to predicting the new character string, output, for display within the text edit region, the new character string;

receive an indication of a third input detected at a third location of the presence-sensitive input component, wherein the third location of the presence-sensitive input component corresponds to the region of the output component at which the graphical keyboard is displayed; and responsive to determining that the third input deletes the new character string from the text edit region after being output for display:

remove, from the text input region, the new character string; and decrease, at a rate or magnitude that is adapted to the input context, the likelihood value associated with the new character string without removing the new character string from the language model.

15. The non-transitory computer-readable storage medium of claim 14 encoded with instructions that, when executed, cause the at least one processor of the computing device to:

store the new character string in at least one n-gram of the language model with the likelihood value, such that the likelihood value corresponds to the at least one n-gram in the language model; and responsive to determining that the third input deletes the new character string:

determine a plurality of n-grams in the language model that include the new character string; and decrease a respective likelihood value that corresponds to each respective n-gram of the plurality of n-grams.

16. The non-transitory computer-readable storage medium of claim 15 encoded with instructions that, when executed, cause the at least one processor of the computing device to:

responsive to determining that a first likelihood value that corresponds a higher-order n-gram of the language model is greater than a second likelihood value that corresponds to a lower-order n-gram, modify the language model to at least:

remove the higher-order n-gram, or update the first likelihood value to be less than or equal to the second likelihood value, wherein the higher-order n-gram includes more character strings than the lower-order n-gram.

17. The non-transitory computer-readable storage medium of claim 14, wherein the input context comprises one or more previously inputted character strings that are outputted for display when predicting the new character string, and the instructions, when executed, further cause the at least one processor of the computing device to decrease the likelihood value associated with the new character string for only the input context.

18. The non-transitory computer-readable storage medium of claim 14, wherein each of the first and second inputs comprise at least one of a discrete tap gesture or a portion of a continuous gesture.

19. The non-transitory computer-readable storage medium of claim 14 encoded with instructions that, when executed, cause the at least one processor of the computing device to:

after decreasing the likelihood value associated with the new character string, receive an indication of a fourth input detected at a fourth location of the presence-sensitive input component, wherein the fourth location of the presence-sensitive input component corresponds to the region of the output component at which the graphical keyboard is displayed;

responsive to predicting, based on the indication of the fourth input and the likelihood value associated with the new character string, the new character string, output, for display within the text edit region, the new character string;

receive an indication of a fifth input detected at a fifth location of the presence-sensitive input component, wherein the fifth location of the presence-sensitive input component corresponds to the region of the output component at which the graphical keyboard is displayed;

responsive to determining that the fifth input deletes the new character string from the text edit region after being output for display:

remove, from the text input region, the new character string; and decrease the likelihood value associated with the new character string without removing the new character string from the language model; and after decreasing the likelihood value associated with the new character string responsive to determining that the fifth input rejects the new character string after being output for display and responsive to determining that the likelihood value is a zero or null value, remove the new character string from the language model.

20. The method of claim 1, further comprising:
determining, based on at least one of the first input, the second input, or the third input, a speed of user input, wherein the rate or magnitude that is adapted to the input context is further adapted to the speed of user input.

* * * * *